(12) United States Patent
Lee et al.

(10) Patent No.: US 10,387,510 B2
(45) Date of Patent: Aug. 20, 2019

(54) CONTENT SEARCH METHOD AND ELECTRONIC DEVICE IMPLEMENTING SAME

(71) Applicant: Samsung Electronics Co., Ltd., Gyeonggi-do (KR)

(72) Inventors: Changsun Lee, Gyeonggi-do (KR); Daehee Kim, Gyeonggi-do (KR); Seunghwan Jeong, Gyeonggi-do (KR); Seungbum Lee, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 769 days.

(21) Appl. No.: 14/843,359

(22) Filed: Sep. 2, 2015

(65) Prior Publication Data

US 2016/0063124 A1 Mar. 3, 2016

(30) Foreign Application Priority Data

Sep. 2, 2014 (KR) .................. 10-2014-0116466

(51) Int. Cl.
*G06F 17/30* (2006.01)
*G06F 16/9535* (2019.01)
*G06F 16/23* (2019.01)
*G06F 16/2457* (2019.01)
*G06F 16/38* (2019.01)
*G06F 16/58* (2019.01)

(52) U.S. Cl.
CPC ...... *G06F 16/9535* (2019.01); *G06F 16/2379* (2019.01); *G06F 16/24578* (2019.01); *G06F 16/38* (2019.01); *G06F 16/5866* (2019.01)

(58) Field of Classification Search
USPC ........ 707/607, 609, 687, 705, 790, 813, 821
See application file for complete search history.

(56) References Cited

U.S. PATENT DOCUMENTS

| | | | |
|---|---|---|---|
| 6,795,815 B2 * | 9/2004 | Zhang | G06N 5/048 706/46 |
| 8,122,061 B1 * | 2/2012 | Guinness | G06F 16/211 707/802 |
| 8,447,752 B2 | 5/2013 | Wang et al. | |
| 2008/0082468 A1 | 4/2008 | Long et al. | |
| 2009/0265631 A1 | 10/2009 | Sigurbjornsson et al. | |

OTHER PUBLICATIONS

George Toderici et al., "Finding Meaning on YouTube: Tag Recommendation and Category Discovery", IEEE Conference on Computer Vision and Pattern Recognition, Jun. 13-18, 2010, 8 pages.
European Search Report dated Jan. 28, 2016 issued in counterpart application No. 15183494.2-1951, 10 pages.

* cited by examiner

*Primary Examiner* — Sana A Al-Hashemi
(74) *Attorney, Agent, or Firm* — The Farrell Law Firm, P.C.

(57) ABSTRACT

A method and an electronic device are provided. The method includes displaying tags; detecting a selection of one of the displayed tags; displaying at least one tag related to the tag; and displaying information regarding at least one content related to the selected tag.

17 Claims, 20 Drawing Sheets

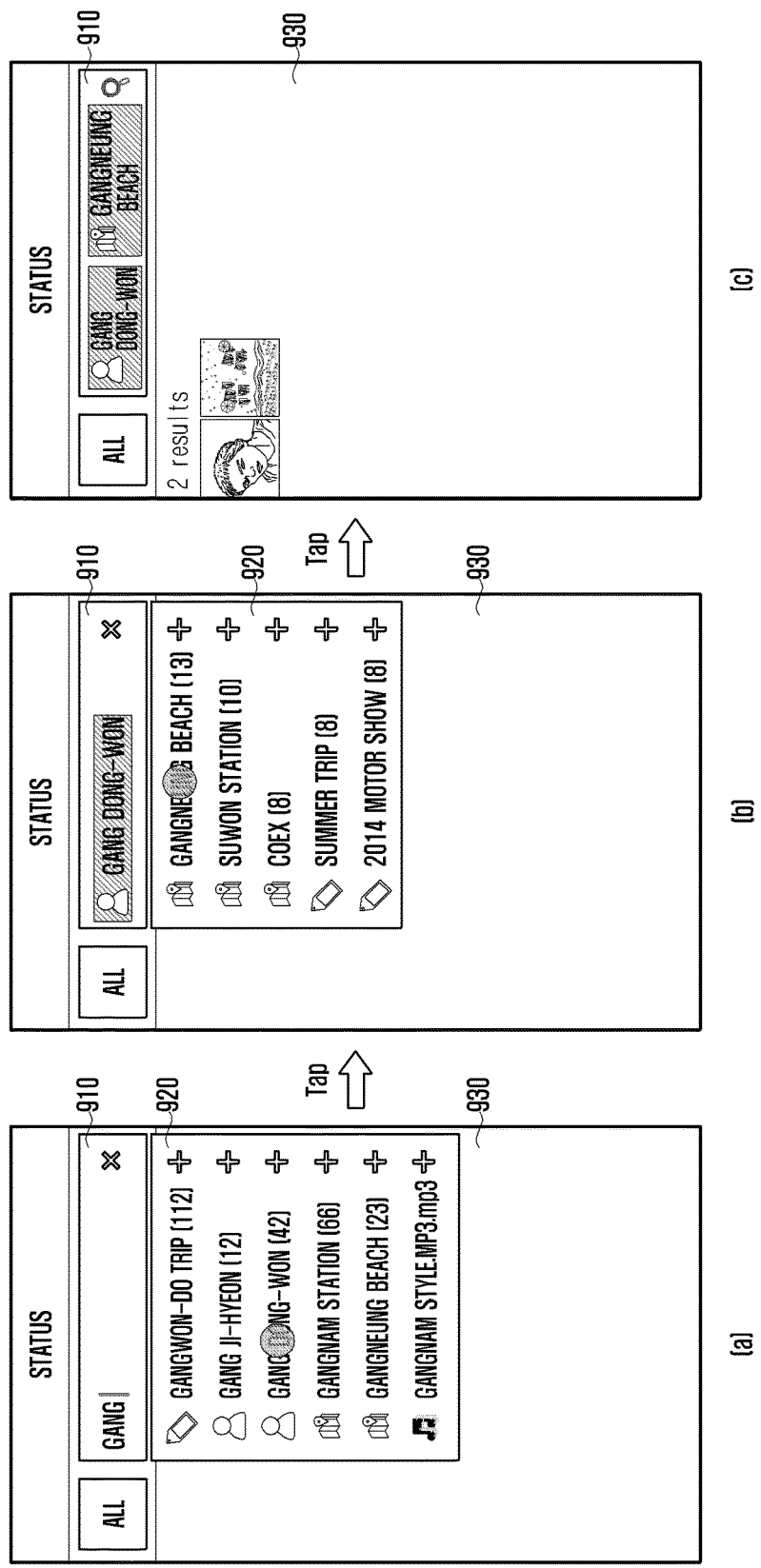

CONTENT SEARCH METHOD AND ELECTRONIC DEVICE IMPLEMENTING SAME

PRIORITY

This application claims priority under 35 U.S.C. § 119(a) to a Korean Patent Application filed on Sep. 2, 2014 in the Korean Intellectual Property Office and assigned Serial No. 10-2014-0116466, the contents of which are incorporated herein by reference.

BACKGROUND OF THE INVENTION

1. Field of the Invention

The present invention relates generally to searching for contents, and more particularly, to a method and an electronic device for searching for contents and providing search results to a user.

2. Description of the Related Art

Portable electronic devices such as smart phones, tablet Personal Computers (PCs), etc. are able to generate or download various contents (e.g., audio data, videos, documents, images, texts, etc.) from an external device, and store the generated or downloaded contents. Further, electronic devices are able to find the contents through a keyword search and provide a result of the search to a user.

If a user inputs a keyword into an electronic device, the electronic device may find contents related to the input keyword and provide the found content to the user. The electronic device may also acquire and display tags related to the contents. If the user selects a desired one of the displayed tags, the electronic device may find contents related to the selected tag, and provide the found contents to the user.

Further, the electronic device may find and provide contents desired by the user, through a tag selection method, than a keyword input method. However, the tags are arranged simply in sequence of date or alphabetical letter. Accordingly, it may be inconvenient for the user to select tags desired by the user.

SUMMARY OF THE INVENTION

The present invention has been made to address as least the above problems and/or disadvantages and to provide at least the advantages described below. Accordingly, an aspect of the present invention provides an electronic device and an operating method of the electronic device for displaying one or more tags, one or more tags related to a selected tag, and information regarding contents related to the selected tag.

In accordance with an aspect of the present invention, a method of is provided. The method includes displaying tags; detecting a selection of one of the displayed tags; displaying at least one tag related to the selected tag; and displaying information regarding at least one content related to the selected tag.

In accordance with another aspect of the present invention, an electronic device is provided. The electronic device includes a display for displaying tags; an input unit for detecting a selection of one of the displayed tags; and a processor that controls the display to display at least one tag related to the selected tag and information regarding at least one content related to the selected tag.

According to another aspect of the present invention, a non-transitory computer-readable recording medium having commands stored therein, the commands being configured to allow at least one processor to perform at least one operation is provided. The at least one operation includes displaying tags; detecting a selection of one of the displayed tags; displaying at least one tag related to the selected tag; and displaying information regarding at least one content related to the selected tag.

According to another aspect of the present invention, an electronic device is provided. The electronic device includes a display unit for displaying tags; an input unit for detecting a selection of one of the displayed tags; a content request module for receiving the selection through the input unit and generating a query about the selected tag; a content providing module for transmitting content information to the content request module in response to the query; and a processor for executing at least one of the content request module and the content providing module, wherein the content providing module acquires identification information on at least one content, in which the selected tag is indexed, from a first database and configures the acquired identification information in the form of a first table, acquires at least one tag in which the acquired identification information is indexed from a second database, configures the at least one acquired tag in the form of a second table, and transmits the first table and the second table to the content request module, and wherein the content request module configures a content screen for display on the display unit, the content screen including at least some of the identification information included in the first table, and configures a tag screen for display on the display unit, the tag screen including at least one tag included in the second table and displays the tag screen on the display unit.

BRIEF DESCRIPTION OF THE DRAWINGS

The above and other aspects, features and advantages of the present invention will be more apparent from the following detailed description taken in conjunction with the accompanying drawings, in which:

FIG. 9 illustrates user interface screens for providing a user experience according to another embodiment of the present invention;

DETAILED DESCRIPTION OF THE EMBODIMENTS OF THE PRESENT INVENTION

Figure 1:
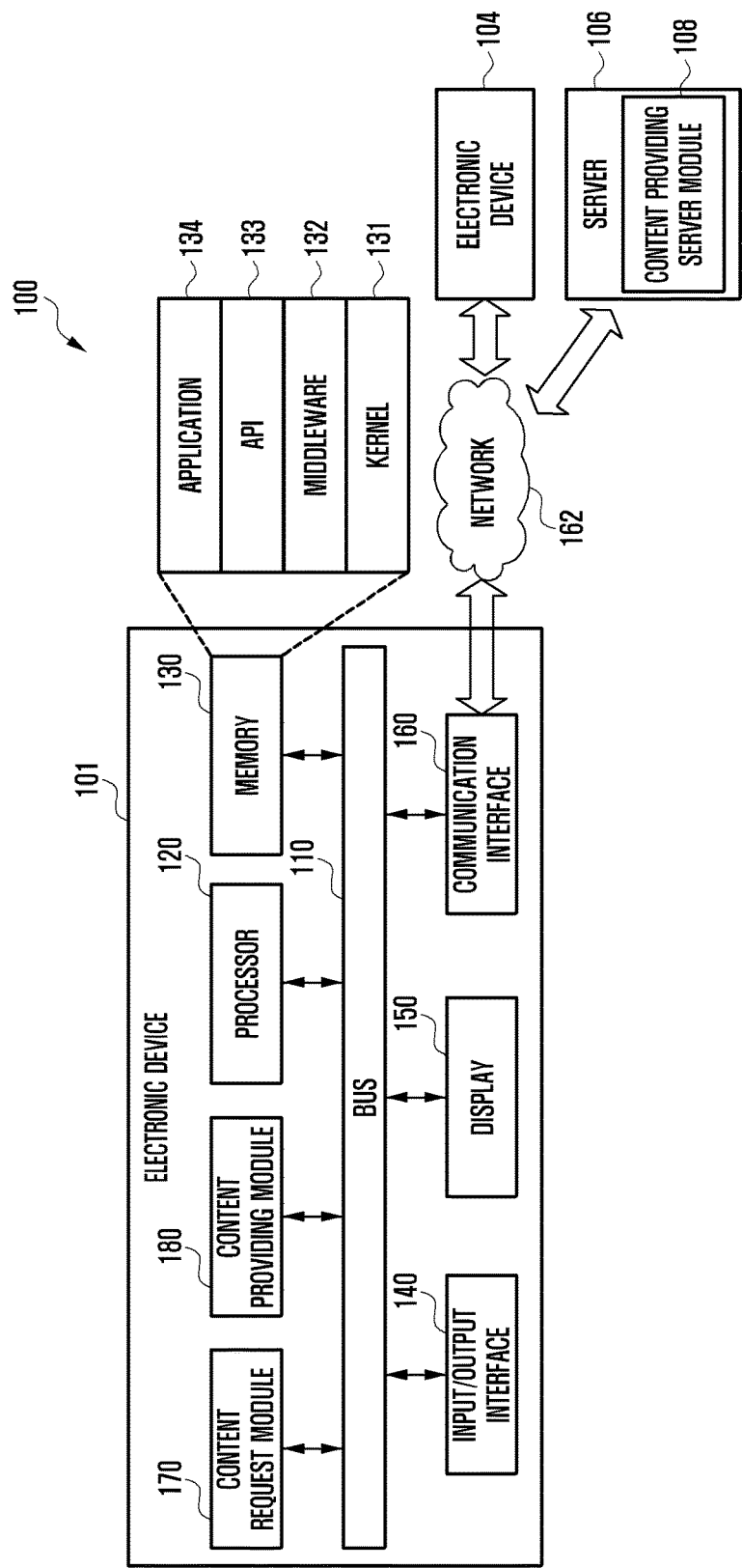
FIG. 1 illustrates a network environment including an electronic device according to an embodiment of the present invention.

Embodiments of the present invention are described with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

The terms "include" or "may include", which may be used in describing various embodiments of the present invention, refer to the existence of a corresponding function, operation, or component that can be used in various embodiments of the present invention, but does not limit the number of additional functions, operations, or components. In describing various embodiments of the present invention, terms such as "include" or "have" may denote a certain characteristic, number, step, operation, constituent element, component or a combination thereof, but may do not exclude the existence of or possibility of adding one or more other characteristics, numbers, steps, operations, constituent elements, components or combinations thereof.

In describing various embodiments of the present invention, the expressions "or" or "at least one of A or/and B" include any or all of combinations of the corresponding items listed together. For example, the expression "A or B" or "at least A or/and B" may include A, may include B, or may include both A and B.

The expressions "1", "2", "first", or "second", when used in describing various embodiments of the present invention, may modify various components of the various embodiments of the present invention without limiting the corresponding components. For example, the above expressions do not limit the sequence and/or importance of the components. These expressions may be used to distinguish one component from other components. For example, a first user device and a second user device indicate different user devices, although both are user devices. For example, a first structural element may be referred to as a second structural element without departing from the scope of embodiments of the present invention. Similarly, a second structural element also may be referred to as a first structural element in accordance with embodiments of the present invention.

When a component is described as being "coupled to" or "connected to" another component, the component may be directly coupled or connected to another component, or a further another component may exist between the component and another component. By contrast, when a component is described as being "directly coupled to" or "directly connected to" another component, a new component does not exist between the component and another component.

The terms used in describing various embodiments of the present invention are merely provided as examples for describing specific embodiments, but do not limit the various embodiments of the present invention. Singular forms also include plural forms, unless the context clearly indicates otherwise.

Unless defined differently, all terms used herein, which include technical terminologies or scientific terminologies, have the same meaning as that understood by a person skilled in the art to which the present invention belongs. Such terms as those defined in a generally used dictionary are to be interpreted to have the definitions equivalent to the contextual meanings in the relevant field of art, and are not to be interpreted to have ideal or excessively formal meanings unless clearly defined in the present description.

An electronic device according to an embodiment of the present invention may be a device including a projection function. For example, an electronic device may be one or a combination of a smart phone, a tablet Personal Computer (PC), a mobile phone, a video phone, an c-book reader, a desktop PC, a laptop PC, a netbook computer, a Personal Digital Assistant (PDA), a camera, or a wearable device (e.g., a Head-Mounted-Device (HMD) such as electronic glasses, electronic clothes, and electronic bracelet, an electronic necklace, an electronic appcessary, an electronic tattoo, and a smart watch).

According to some embodiments of the present invention, an electronic device may be a smart home appliance having a projection function. For example, the smart home appliance may include a TeleVision (TV), a Digital Video Disk (DVD) player, an audio player, an air conditioner, a cleaner, an oven, a microwave oven, a washing machine, an air cleaner, a set-top box, a TV box, a game console, an electronic dictionary, an electronic key, a camcorder, or an electronic frame.

According to some embodiments of the present invention, an electronic device may include various types of medical devices (e.g., Magnetic Resonance Angiography (MRA), Magnetic Resonance Imaging (MRI), Computed Tomography (CT), a scanner, an ultrasonic device and the like), a navigation device, a Global Positioning System (OPS) receiver, an Event Data Recorder (EDR), a Flight Data Recorder (FDR), a vehicle infotainment device, electronic equipment for a ship (e.g., a navigation device for ship, a gyro compass, etc.), avionics, a security device, a head unit for a vehicle, an industrial or home robot, or an Automatic Teller Machine (ATM) of financial institutions, and a Point Of Sale (POS) device.

According to some embodiments of the present invention, an electronic device may include furniture or a part of a building/structure, an electronic board, an electronic signature receiving device, a projector, and various types of measuring devices (e.g., a water meter, an electricity meter, a gas meter, a radio wave meter, etc.) including a projection function. An electronic device according to various embodiments of the present invention may include one or a combination of the above described various devices. Further, an electronic device according to various embodiments of the present invention may be a flexible device. An electronic device according to various embodiments of the present invention is not limited to the above described devices.

The term "screen", when used in describing various embodiments of the present invention, may refer to a screen of a display unit. For example, the term "screen" may be used in this manner in phrases such as "an image is displayed on a screen", "a display unit displays an image on a screen", and "a controller controls a display unit to display an image on a screen" may be used as "a screen of a display unit". Further, the term "screen" may refer to a target to be displayed on a display unit. For example, the term "lock screen" may be used in this manner in phrases such as "a lock screen is displayed", "a display unit displays a lock screen", and "a controller controls a display unit to display a lock screen".

Herein, the term "user", when used in describing various embodiments of the present invention, may refer to a person who uses an electronic device or a device (e.g., an artificial intelligence electronic device) that uses an electronic device.

FIG. 1 illustrates a network environment including an electronic device according to an embodiment of the present invention.

Referring to FIG. 1, an electronic device 101 includes a bus 110, a processor 120, a memory 130, an input/output interface 140, a display 150, a communication interface 160, a content request module 170, and a content providing module 180.

The bus 110 may be a circuit that connects the above described components and transmits communications (e.g., a control message) between the above described components.

The processor 120 receives commands from other components of the electronic device 101 through the bus 110, analyzes the received commands, and executes calculation or data processing according to the analyzed commands.

The memory 130 stores commands or data received from or generated by the processor 120 or other components of the electronic device. The memory 130 includes programming modules (e.g., a kernel 131, middleware 132, an Application Programming Interface (API) 133, and an application 134). Each of the aforementioned programming modules may be implemented by software, firmware, hardware, or a combination thereof.

The kernel 131 controls or manages system resources (e.g., the bus 110, the processor 120, or the memory 130) used for executing an operation or function implemented by the remaining other programming modules (e.g., the middleware 132, the API 133, or the application 134). Further, the kernel 131 provides an interface for accessing individual components of the electronic device 101 from the middleware 132, the API 133, or the application 134 to control or manage the components.

The middleware 132 performs a relay function of allowing the API 133 or the application 134 to communicate with the kernel 131 to exchange data. Further, the middleware 132 performs a control for the operation requests (e.g., scheduling or load balancing) received from the application 134 by using a method of assigning, to the application 134, a priority, by which system resources (e.g., the bus 110, the processor 120, the memory 130, etc.) of the electronic device 101 can be used.

The API 133 is an interface by which the application 134 can control a function provided by the kernel 131 or the middleware 132. The API 133 includes, for example, at least one interface or function (e.g., a command) for a file control, a window control, image processing, or a character control.

According to an embodiment of the present invention, the application 134 may include a Short Message Service (SMS)/Multimedia Messaging Service (MMS) application, an email application, a calendar application, an alarm application, a health care application (e.g., an application for measuring a quantity of exercise or blood sugar) or an environment information application (e.g., an application providing information on barometric pressure, humidity or temperature). Additionally or alternatively, the application 134 may be an application related to an information exchange between the electronic device 101 and an external electronic device (e.g., electronic device 104). An application related to the information exchange may include, for example, a notification relay application for transferring particular information to the external electronic device or a device management application for managing the external electronic device.

For example, a notification relay application may include a function of transmitting notification information generated by another application (e.g., an SMS/MMS application, an email application, a health care application or an environment information application) of the electronic device 101 to the external electronic device 104. Additionally or alternatively, the notification relay application may receive notification information from, for example, the external electronic device 104 and provide the received notification information to the user. The device management application may manage (e.g., install, remove, or update) at least a part of functions (e.g., turning on/off the external electronic device 104 (or some components of the external electronic device 104) or controlling a brightness of the display) of the external electronic device 104 communicating with the electronic device 101, an application executed in the external electronic device 104, or a service (e.g., a call service or a message service) provided by the external electronic device 104.

According to an embodiment of the present invention, the application 134 may include an application designated according to an attribute (e.g., a type of electronic device) of the external electronic device 104. For example, if the external electronic device 104 is a Motion Picture Experts Group (MPEG) Audio Layer-3 (MP3) player, the application 134 may include an application related to music reproduction. Similarly, if the external electronic device 104 is a mobile medical device, the application 134 may include an application related to health care. According to an embodiment of the present invention, the application 134 may include at least one of an application designated (e.g., preloaded) to the electronic device 101 and an application received from an external electronic device (e.g., server 106 or electronic device 104).

The input/output interface 140 transmits a command or data input from the user through an input/output device (e.g., a sensor, a keyboard, or a touch screen) to the processor 120, the memory 130, the communication interface 160, or the display 150 through, for example, the bus 110. For example, the input/output interface 140 may provide data on a user's touch input through a touch screen to the processor 120. Further, the input/output interface 140 may output a command or data received, through, for example, the bus 110, from the processor 120, the memory 130, the communication interface 160, or the projecting management module 170 through an input/output device (e.g., a speaker or a display). For example, the input/output interface 140 may output voice data processed through the processor 120 to the user through the speaker.

The display 150 displays various pieces of information (e.g., multimedia data, text data, or the like) for the user.

The communication interface 160 connects communication between the electronic device 101 and an external device (e.g., electronic device 104 or server 106). For example, the communication interface 160 may access a network 162 through wireless or wired communication to communicate with the external device. The wireless communication includes at least one of, for example, WiFi, BlueTooth (BT), Near Field Communication (NFC), a Global Positioning System (GPS), and cellular communication (e.g., Long-Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro) or Global System for Mobile communications (GSM)). The wired communication may include, for example, a Universal Serial Bus (USB), a High Definition Multimedia Interface (HDMI), Recommended Standard 232 (RS-232), and a Plain Old Telephone Service (POTS).

According to an embodiment of the present invention, the network 162 may be a telecommunication network including at least one of a computer network, Internet, Internet of things, and a telephone network. According to an embodiment of the present invention, a protocol (e.g., transport layer protocol, data link layer protocol, or physical layer protocol) for communication between the electronic device 101 and the external device may be supported by at least one of the application 134, the application programming interface 133, the middleware 132, the kernel 131, and the communication interface 160.

According to an embodiment of the present invention, a server 106 may support the driving of the electronic device 101 by performing at least one of the operations (or function) implemented by the electronic device 101. For example, the server 106 may include a content providing server module 108 that can support the content providing module 180 implemented in the electronic device 101. For example, the content providing server module 108 may include at least one component of the content providing module 180, and may perform at least one operation (e.g., operate as a proxy) performed by the content providing module 180.

The content request module 170 may process at least some pieces of information acquired from other components of the electronic device 101, and may provide the processed information to the user through various methods. For example, the content request module 170 may receive a search request through the input/output interface 140 and make a request for providing information on contents to the content providing module 180.

The content providing module 180 may process at least some pieces of information acquired from other components (e.g., the processor 120, the memory 130, the input/output interface 140, the communication interface 160, or the content request module 170), and may provide the processed information to the user through various methods. For example, the content providing module 180 may operate as a server and respond to a request from a client (e.g., the content request module 170) by providing information on tags and contents to the content request module 170.

According to an embodiment of the present invention, some components of the content providing module 180 may be included in an external device (e.g., the content providing server module 108) and receive supporting of at least one operation implemented by the content providing module 180 from the content providing server module 108.

Additional information regarding the content request module 170 and the content providing module 180 is described as follows with reference to FIG. 2.

Figure 2:
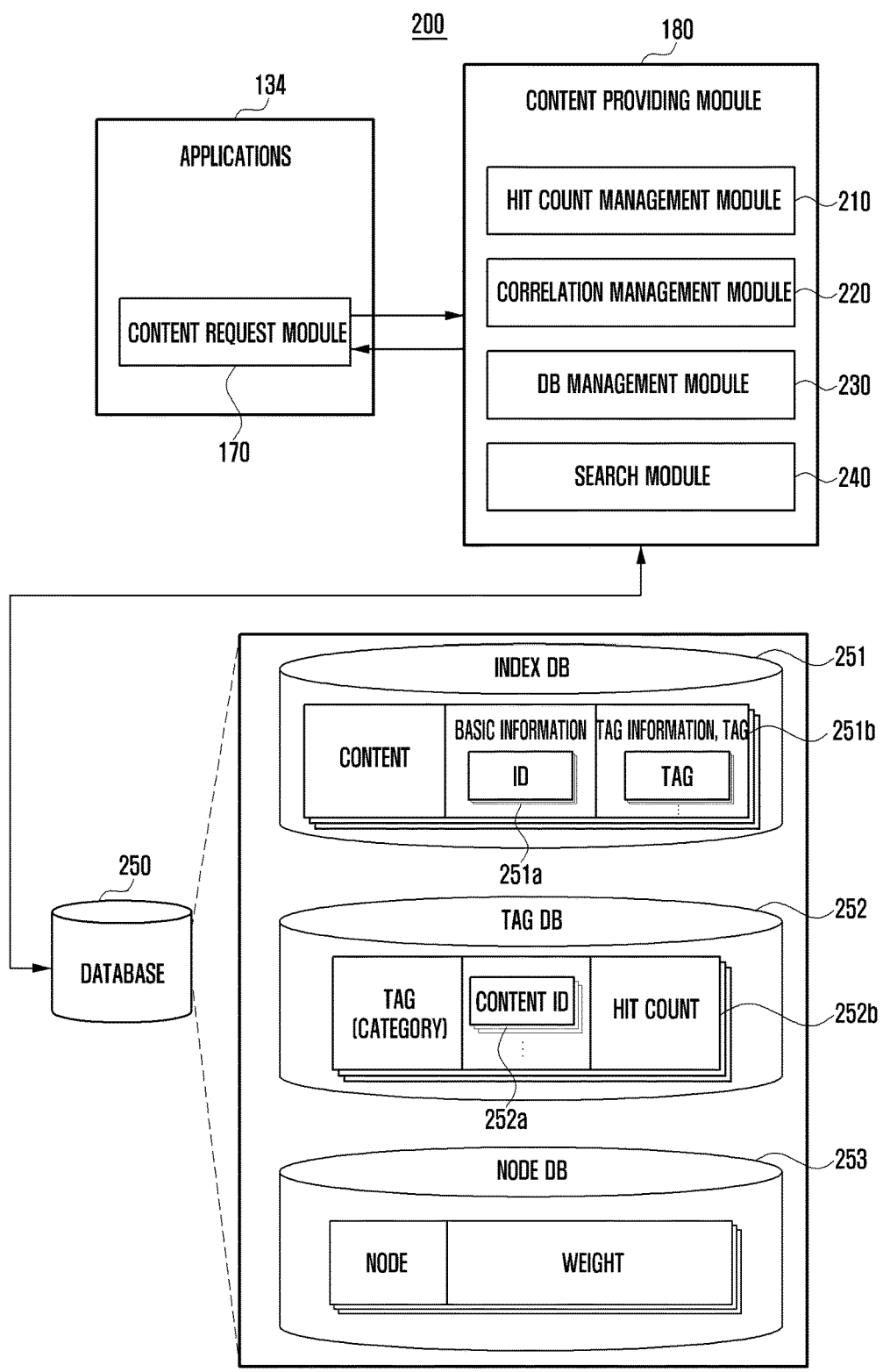
FIG. 2 is a block diagram illustrating a content request module and a content providing module according to an embodiment of the present invention.

FIG. 2 is a block diagram illustrating a content request module and a content providing module of the electronic device of FIG. 1 according to an embodiment of the present invention.

Referring to FIG. 2, the content request module 170 may be a component of applications 134 (e.g., applications that provide a user interface for an interaction with a user). The content request module 170 may be interchangeable with a content resolver.

The applications 134 may receive commands or data from the user through the input/output interface 140, and, if the received commands (or data) are related to a content search, the applications 134 may transmit the commands (or data) to the content request module 170. For example, the content request module 170 may receive a request for searching for contents from the applications 134. Further, the content request module 170 may receive a selection of one of the displayed tags from the applications 134. The content request module 170 may generate an information request corresponding to the search request (or tag selection) and transmit the generated information request to the content providing module 180.

The content providing module 180 may process the information request from the content request module 170 and return a result of the processing to the content request module 170. The content providing module 180 includes, for example, a hit count management module 210, a correlation management module 220, a DataBase (DB) management module 230, and a search module 240 to perform this processing.

The content providing module 180 may determine search criteria based on the received information request. For example, the content providing module 180 may determine the type of target to be searched for based on application information included in the information request. If a subject making the information request is a gallery application (i.e., if information indicating that the subject making the information request is a gallery is included in the information request), the target to be searched for may be limited to an image and a video. Unless the search range is separately designated (e.g., if a value indicating a search range of an initial information request is "null" in a search process), the content providing module 180 may determine all contents in a predetermined database as targets to be searched for. An information request generated after the initial information request may also include a tag or information indicating the tag, and the tag or the information may be used for determining the search criteria (e.g., used as an element for limiting the search range).

The hit count management module 210 may manage the number of times by which the user selects (or inputs) the tag. For example, if the tag is newly added to the tag DB 252, the hit count management module 210 may set a hit count of the added tag to a predetermined value (e.g., "0") and add the set value to the tag DB 252. In a state where the number of times by which any tag, for example, tag A is selected by the user is "0" (that is, in a state where tag A has been only added to the tag DB 252 but has not been selected yet by the user), if information indicating tag A is included in the information request, the hit count management module 210 may update a hit count of tag A to be "1". If a predetermined condition of the hit count is met (e.g., a predetermined update period expires or tag A is removed), the hit count management module 210 may delete the hit count (e.g., reset the hit count to a predetermined value (e.g., "0"). In response to a request from any module (e.g., the search module 240), the hit count management module 210 may search for a hit count corresponding to the request and transmit a result of the search to the search module 240.

According to an embodiment of the present invention, the hit count management may be supported by an external device (e.g., the server 106). For example, the content providing module 180 may transmit a message including "information indicating that any tag is selected" to an external device through the communication interface 160 and the network 162. The external device may update the hit count of the corresponding tag and store the updated hit count in its own memory. In response to a request from the electronic device 101 (e.g., the content providing module 180 of the electronic device 101), the external device may transmit information on the hit count to the electronic device 101 through the network 162.

The correlation management module 220 may manage a relationship (i.e., a node) between categories (e.g., a location (L), a person (P), an event (E), a scene type (S), a time (T), and a user (U)) of the tag. For example, if the tag is newly added to the tag DB 252, and the added tag is classified as a new category instead of an existing category, the correlation management module 220 may generate a new node that connects the new category and the existing category, and store the generated node in a database 250 (e.g., store the generated node within correlation information in a node DB 253). Any tag may be deleted from the tag DB 252. Then, the correlation management module 220 may identify whether a category belonging to the deleted tag exists in the tag DB 252. Based on the result of the identification, if there is a determination that the category does not exist anymore, the correlation management module 220 may remove the corresponding category and the related node. In response to a request from any module (e.g., the search module 240), the correlation management module 220 may search for a node corresponding to the request and transmit a result of the search (e.g., a value assigned to the corresponding node) to the search module 240.

The correlation management module 220 may digitize the correlation between the categories. For example, the value (e.g., a node weight) assigned to the node may indicate the degree of correlation between the corresponding categories. For example, if a value assigned to a relationship between the "location" category and the "time" category is "5" and a value assigned to a relationship between the "location" category and the "event" category is "4", the values indicate that the location is more highly correlated to the time than the event. As described above, the degree of the correlation between the categories may be expressed as the value, but embodiments of the present invention are not limited thereto. Alternatively, in place of the value, a level may be assigned to the node. The level may indicate the degree of correlation between the corresponding categories. For example, if a level assigned to the relationship between the "location" category and the "time" category is "High" and a level assigned to the relationship between the "location" category and the "event" category is "Low", the levels indicate that the location is more highly correlated to the time than the event.

According to an embodiment of the present invention, the correlation management may be supported by an external device (e.g., the server 106). For example, the content providing module 180 may transmit update information indicating the weight of any node to the external device through the communication interface 160 and the network 162. The external device may update the weight of the corresponding node and store the updated weight in its own memory. In response to a request from the electronic device 101 (e.g., the content providing module 180 within the electronic device 101), the external device may transmit information on the node weight to the electronic device 101 through the network 162.

The DB management module 230 may manage the database 250. The database 250 may be stored in the memory 130, and may include at least one of an index DB 251, a tag DB 252, and the node DB 253.

The index DB 251 is a database in which information related to contents is indexed, and includes, for example, basic information 251a and tag information 251b. The basic information 251a may include at least one piece of information (e.g., a format, a compression type, etc.) regarding the corresponding contents, organized according to each content. Further, the basic information 251a includes identification (ID) information for identifying the corresponding contents. According to an embodiment of the present invention, the identification information may be a Uniform Resource identifier (URI) for identifying the corresponding contents. For example, the URI may be a Uniform Resource Locator (URL) indicating a location of a computer having the corresponding contents.

The tag information 251b may include at least one tag related to the corresponding contents, according to each content. The tag may be data additionally generated by the electronic device 101 (e.g., the DB management module 230) when the corresponding contents are generated by the electronic device 101.

The DB management module 230 may add the acquired basic information, tag, and information related to the tag (e.g., the category) to the index DB 251 as index information on the corresponding contents (e.g., an acquired picture).

According to an embodiment of the present invention, if a picture is acquired by a camera, the DB management module 230 may add a format and a compression type of the picture to the index DB 251 as basic information on the acquired picture. Further, the DB management module 230 may add location information acquired if the picture is taken to the index DB 251 as a tag of the picture. In addition, the DB management module 230 may classify the category of the added tag as the "location" category. The location information may include at least one piece of latitude and longitude information, geographical address information (e.g., 416 Metan 3-dong, Yeongtong-gu, Suwon-si, Gyeonggi-do) and information related to the geographical address.

According to an embodiment of the present invention, the information related to the geographical address may include at least one piece of information (e.g., a building name, a café name, a city hall name, a department store name, etc.) on a building located at (or adjacent to) the geographical address, structure information (e.g., a tunnel name, a mountain name, a cell ID of a Base Station (BS), etc.), an IP address corresponding to the geographical address, and a phone number corresponding to the geographical address. Other various pieces of information related to the geographical address may be included in the location information.

The DB management module 230 may recognize a time when the picture is taken, add information related to the recognized time to the index DB 251 as a tag of the picture, and classify the tag as the "time" category. Further, the electronic device 101 may recognize an object in the acquired picture. For example, the electronic device 101 may extract the object from the picture and compare the extracted object with predetermined data (e.g., a picture included in the contact), so as to recognize what the extracted object is. The DB management module 230 may add information (e.g., a name) related to the recognized object to the index DB 251 as a tag of the picture, and classify the tag as the "scene type" category.

According to various embodiments of the present invention, a tag may be downloaded from the electronic device 101 together with the corresponding contents. For example, profile information on a main character may be downloaded to the electronic device 101 together with a movie file. The DB management module 230 may add the profile information to the index DB 251 as a tag of the movie file and classify the profile information as, for example, the "person"

category. Category information regarding the profile information may also be downloaded to the electronic device 101.

According to various embodiments of the present invention, a tag may be text data or image data input by the user in connection with corresponding contents. For example, the DB management module 230 may add the input text data or image data to the index DB 251 as a tag of the corresponding contents. Further, the category of the tag may be selected (or input) by the user. For example, if a category list is displayed and one category is selected from the list, the DB management module 230 determines the selected category as the category of the corresponding tag. If any content is deleted, the DB management module 230 may delete tag information and basic information related to the deleted content from the index DB 251. Further, if any module (e.g., the search module 240) requests the DB management module 230 for information related to any content, the DB management module 230 may search for the related information (e.g., basic information, a tag, and a category including the tag) and transmit a result of the search to the search module 240 in response to the request.

The tag DB 252 is a database in which information related to the tag is indexed, and may include, for example, a content ID 252a and hit count information 252b. The content ID 252a is identification information (e.g., a Uniform Resource Identifier (URI)) regarding the content related to the corresponding tag. The hit count information 252b may include, for each tag, a hit count indicating the number of times by which the corresponding tag is selected by the user.

The DB management module 230 may add the acquired content ID and category to the tag DB 252 as index information regarding the corresponding tag (e.g., acquired location information). Further, if any tag is deleted, the DB management module 230 may delete information (e.g., a content ID) related to the deleted tag from the tag DB 252. Further, if any module (e.g., the search module 240) requests the DB management module 230 for information related to any content, the DB management module 230 may search for the related information (e.g., a content ID) and transmit a result of the search to the search module 240 in response to the request.

The correlation information in the node DB 253 may include, for each node, a weight assigned to the corresponding node.

According to an embodiment of the present invention, the DB management may be supported by an external device (e.g., the server 106). Further, the database 250 may be stored in a memory of the corresponding external device. For example, the content providing module 180 may transmit a message making a request for information related to any content or tag to an external device through the communication interface 160 and the network 162. In response to the message, the external device may transmit the corresponding information to the electronic device 101 through the network 162.

The search module 240 may access a predetermined database (e.g., the database 250), search for information related to a query in the database 250, and return a result of the search to the content request module 170. The returned search result may include the information related to the query. For example, if the content is an image, then a thumbnail, a name, etc. for identifying the corresponding image may be included in the search result. Further, the returned search result may include at least one tag related to the content or information on the tag.

According to some embodiments of the present invention, the predetermined database may include a database stored in an external device (e.g., the server 106). Accordingly, the search module 240 may transmit the message making the request for the content information to the external device through the communication interface 160 and the network 162. In response to the request from the search module 240, the external device may search for information related to a query in its own database and transmit a result of the search to the search module 240 through the communication interface 160 and the network 162. The search module 240 may return the search result received from the external device to the content request module 170.

The search module 240 may manage a policy for generating the search result. For example, the search module 240 may determine the policy based on at least one piece of the hit count information 252b and the correlation information in the node DB 253. The search module 240 may generate a search result based on the determined policy and return the search result to the content request module 170. According to an embodiment of the present invention, the search module 240 may acquire tags related to the tag selected by the user from the tag DB 252, identify a hit count of each of the acquired tags in the tag DB 252, and arrange the acquired tags based on the hit count. For example, the search module 240 may sequentially arrange the acquired tags according to an order from the largest hit count to the smallest hit count and return the arranged tags to the content request module 170. According to an embodiment of the present invention, the search module 240 may determine one of the categories as a highest priority category. The search module 240 may acquire node weights of the other categories from a predetermined database (e.g., the correlation information in the node DB 253) based on the highest priority category. The search module 240 may determine the rank of the other categories ranging from a largest node weight to a smallest node weight. The search module 240 may arrange the tags according to the determined rank. For example, the search module 240 may arrange tags included in the highest priority category in a first column and arrange tags included in the other categories in corresponding columns according to the rank of the corresponding categories, and then return the arranged tags to the content request module 170.

The search module 240 may configure the search result in the form of a predefined table and return the search result in the table form to the content request module 170.

Figure 3:
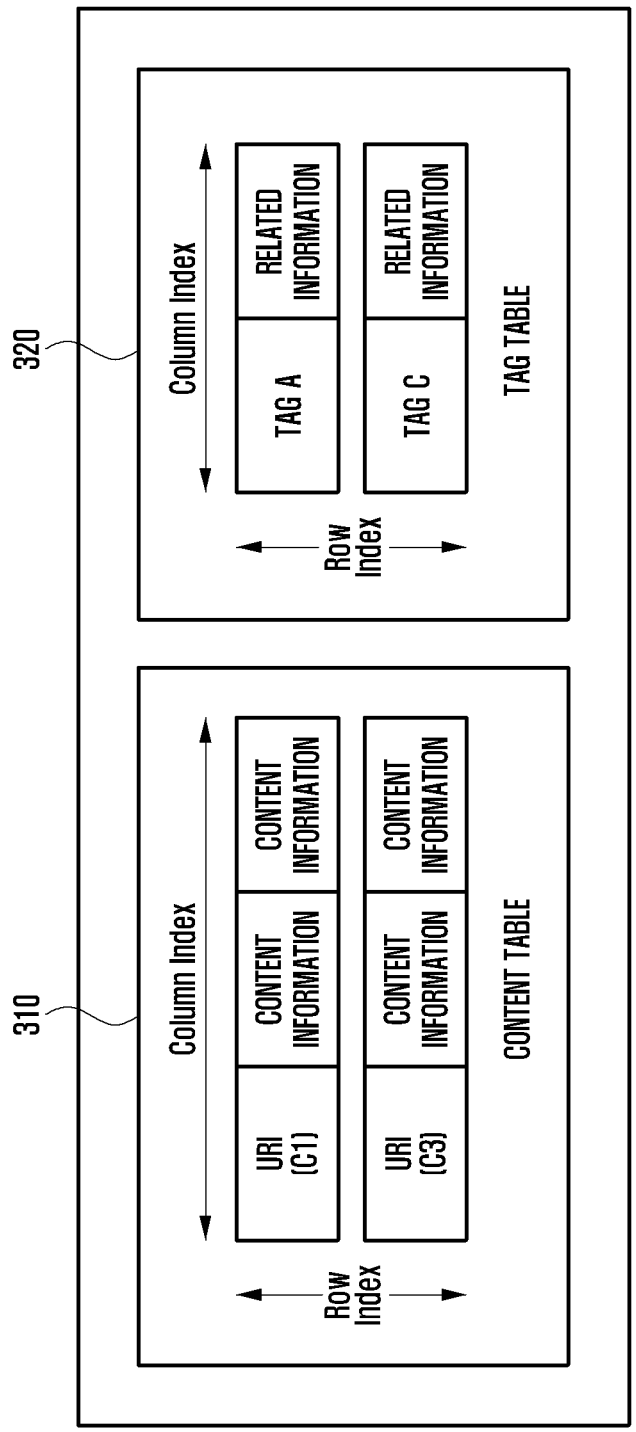
FIG. 3 is a diagram illustrating examples of tables including different types of pieces of data according to an embodiment of the present invention.

FIG. 3 is a diagram illustrating examples of tables including different types of pieces of data according to an embodiment of the present invention.

Referring to FIG. 3, according to an embodiment of the present invention, the search module 240 searches for contents related to a query (e.g., information indicating that any tag is selected by the user) in a predetermined database (e.g., the index DB 251). In the present example, tag A is indexed in a first content (C1), tag B is indexed in a second content (C2), tags A and C are indexed in a third content (C3), and tag A is selected by the user. The search module 240 determines the content including selected tag A as index information (i.e., the first content and the third content) as content related to tag A. The search module 240 may configure information regarding the found contents in the form of a content table 310 as illustrated in FIG. 3. The content table 310 includes identification information (i.e., a URI) regarding the first content (C1) in a first cell of a first row. Identification information regarding the third content (C3) is included in a first cell of a second row. Different cells of each row include information on contents (e.g., content names, representative images, and the like) corresponding to the row. The content table 310 indicates a data structure, and may be interchangeable with another term for such a data structure. For example, the content table 310 may be interchangeable with a document cursor in an Android operating system model. According to an embodiment of the present invention, the content table 310 includes "information for identifying a content" in a first cell of each row and other information related to the corresponding content in other cells of each row.

The search module 240 searches for tags related to the query in a predetermined database (e.g., the tag DB 252). For example, IDs of the first content and the third content are indexed in tag A, an ID of the second content is indexed in tag B, the ID of the third content is indexed in tag C, and tag A may be selected by the user. The search module 240 recognizes that the content IDs indexed in selected tag A are the IDs of the first content and the third content. The search module 240 determines the tag (e.g., tag C) including at least one of the IDs of the first content and the third content as index information as a tag related to tag A. In other words, the search module 240 acquires information (e.g., a URI) on the content in which the selected tag is indexed from the index DB 251 and acquires the tag in which the information on the acquired content is indexed from the tag DB 252.

According to an embodiment of the present invention, the search module 240 searches for a tag related to the selected tag in the index DB 251. For example, the search module 240 may select contents related to the selected tag from the index DB 251, acquire tags indexed in the selected contents, and determine the acquired tags as the tags related to the selected tag. The search module 240 may also identify whether there are overlapping tags in the acquired tags. If there are the overlapping tags, the search module 240 may exclude the overlapping tags from the acquisition. For example, the search module 240 may acquire a first tag indexed in the first content from the index DB 251. Then, the search module 240 may acquire a second tag indexed in the second content and recognize that the second tag is the same as the first tag. Accordingly, the search module 420 may exclude the second tag from the acquisition. Due to the processing required to exclude the overlapping tags, time required to perform the method of searching for the related tags in the index DB 251 and return the search result to the content request module 170 may be longer than the time required with respect to the method of searching for the related tags in the tag DB 252.

According to an embodiment of the present invention, the processing of excluding the overlapping tags may be performed by one or more of the applications 134 (e.g., the content request module 170). For example, if the search module 240 transmits tags in a matrix structure, which have not passed through the overlap processing, to the content request module 170, the content request module 170 may re-configure the matrix by leaving only one of the overlapping tags and deleting the remaining tags.

The search module 240 may configure a selected tag and tags related to the selected tag in a form of a tag table 320 as illustrated in FIG. 3. The tag table 320 includes tag A in a first cell of a first column. Tag C is included in a first cell of a second column. According to an embodiment of the present invention, the search module 240 arranges tags in the tag table 320 based on a hit count. For example, the search module 240 may sequentially arrange tag A in the first column and tag C in the next column in order from a lowest to a highest hit count. According to an embodiment of the present invention, the search module 240 arranges the tags in the tag table 320 based on a node weight. For example, the search module 240 may arrange tag A included in a highest priority category in the first column and tag B included in a category having a largest node weight in the next column.

Information (e.g., a category, the number of related contents, and the like) regarding the tags may be included in different cells of each column. The tag table 320 may be interchangeable with a category cursor in an Android operating system model. The tag table 320 includes a respective tag in the first cell of each row and includes information regarding the corresponding tag in other cells of each row.

The search module 240 may configure the content table 310 and the tag table 320 as a single table (that is, a stacked cursor) and, in response to a request from the content request module 170, return the single table to the content request module 170.

According to various embodiments of the present invention, an electronic device may include: a display that displays tags; an input unit that detects a selection of one of the displayed tag; and a processor that controls the display to display information related to the selected tag, and controls the display to display at least one tag related to the selected tag and information regarding at least one content related to the selected tag.

The processor may acquire the information regarding the at least one content related to the selected tag from a storage device, acquires at least one other tag related to the at least one content from the storage device, and controls the display to display the at least one other tag related to the at least one content.

The processor may arrange a plurality of tags, including the selected tag and the at least one tag related to the selected tag, based on at least one of a hit count of each of the plurality of tags and a node weight and displays the arranged tags on the display, wherein the hit count of a specific tag includes the number of times by which the specific tag has been selected, and wherein the node weight is a value which is assigned to a node indicating a relationship between a specific category and other category and which indicates the number of times by which, after a tag included in the specific category as the selected tag has been selected, a tag included in the other category has been selected.

The processor may acquire, based on the specific category including the selected tag, a node weight of each of nodes each of which indicates a relationship between the specific category and each of other categories, determines a rank of the specific category of the selected tag and a rank of each of the other categories based on the node weight of each of the nodes, and arranges the at least one tag related to the at least one selected tag based on the determined ranks, and controls the display to display the arranged at least one tag.

The processor may the processor determines the rank of the category including the at least one selected tag as a first rank and determines the ranks of the at least one other category sequentially in descending order of node weight of each category.

The processor may update at least one of a node weight of the category including the at least one selected tag and a hit count of the at least one selected tag.

The processor may control the display to visually distinguish the at least one selected tag from the at least one tag related to the selected tag.

After the detection of the selection of the at least one tag, the processor may control the display to end displaying of tags that are not related to the at least one selected tag, among a plurality of tags.

According to various embodiments of the present invention, an electronic device may include: a display unit for displaying tags; an input unit for detecting a selection of one of the displayed tags; a content request module for receiving the selection through the input unit and generating a query about the selected tag; a content providing module for transmitting content information to the content request module in response to the query; and a processor for executing at least one of the content request module and the content providing module.

The content providing module may acquire identification information on at least one content, in which the selected tag is indexed, from a first database (for example, the index DB 251) and configures the acquired identification information in the form of a first table, acquires at least one tag in which the acquired identification information is indexed from a second database (for example, the tag DB 252), configures the at least one acquired tag in the form of a second table, and transmits the first table and the second table to the content request module.

The content request module may configure a content screen for display on the display unit, the content screen including at least some of the identification information included in the first table, and configures a tag screen for display on the display unit, the tag screen including at least one tag included in the second table and displays the tag screen on the display unit.

Figure 4:
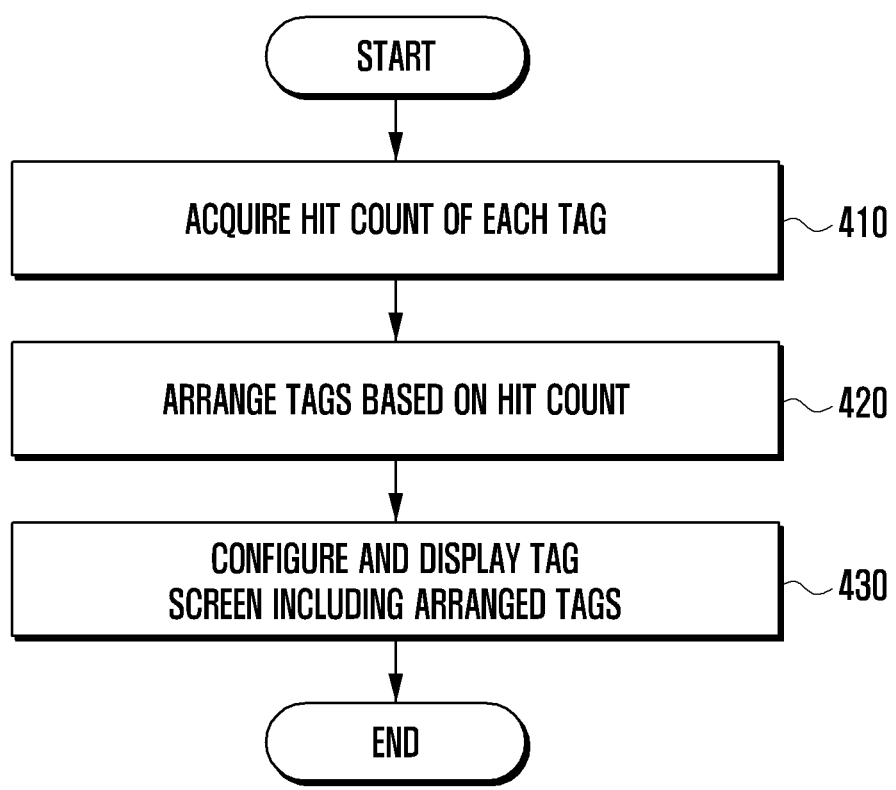
FIG. 4 is a flowchart illustrating a tag display method based on a hit count according to an embodiment of the present invention.

FIG. 4 is a flowchart illustrating a tag display method based on a hit count according to an embodiment of the present invention.

Referring to FIG. 4 according to an embodiment of the present invention, the processor 120 acquires a hit count of each tag from the tag DB 252, in step 410.

In step 420, the processor 120 arranges tags based on at least one of the acquired hit count and the node weight. According to an embodiment of the present invention, the processor 120 sequentially arranges the tags in an order according to sizes of respective hit counts. For example, the processor 120 may arrange the tag having the largest hit count in a first column and arrange the remaining tags in the following columns in a descending order. According to an embodiment of the present invention, the processor 120 arranges the tag having the largest hit count in a first row and arranges the remaining tags in the following rows in a descending order.

In step 430, the processor 120 configures a tag screen including the arranged tags and displays the tag screen on the display 150. For example, the tag having the largest hit count may be arranged on the uppermost and leftmost side of the tag screen. The tag having the next largest hit count may be arranged next to or below the tag having the largest hit count. The processor 120 may configure the tag screen with only some of the tags. In response to a user input (e.g., a user's touch gesture, such as a drag) on the tag screen, the tag screen may be re-configured to include some of the other tags.

Figure 5:
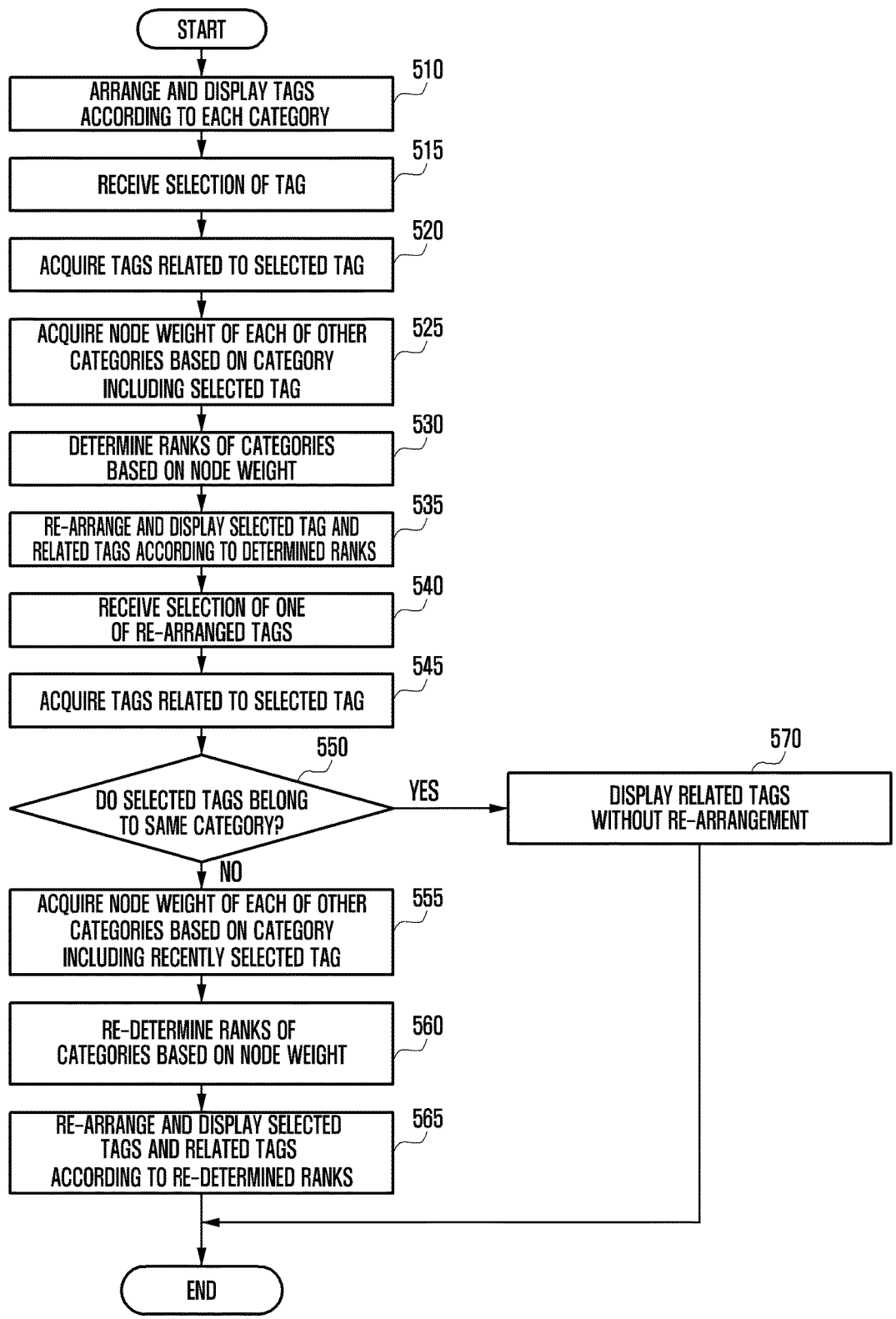
FIG. 5 is a flowchart illustrating a tag display method based on a node weight according to an embodiment of the present invention.
Figure 6:
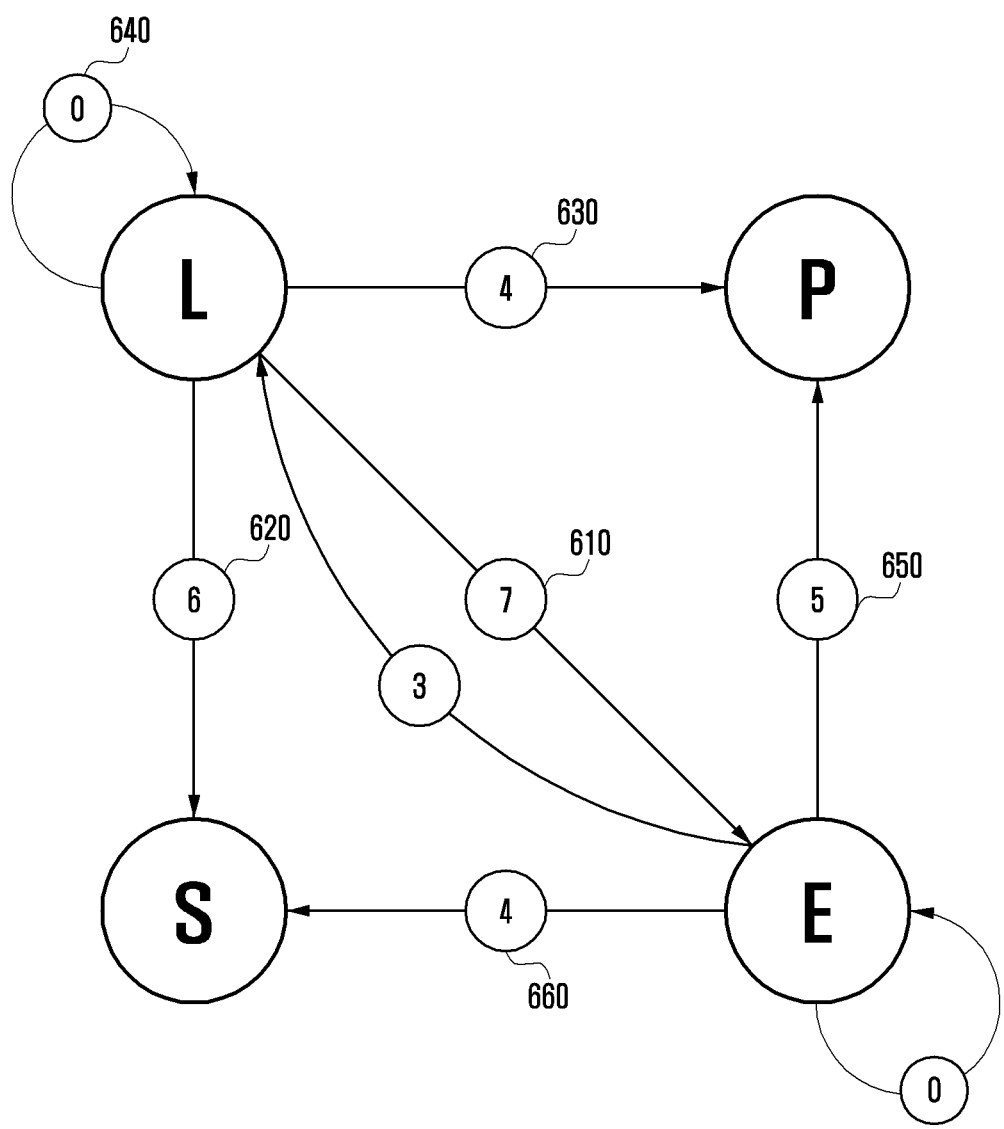
FIG. 6 illustrates an example of a node weight according to an embodiment of the present invention.

FIG. 5 is a flowchart illustrating a tag display method based on a node weight according to an embodiment of the present invention. FIG. 6 illustrates an example of a node weight according to an embodiment of the present invention.

Referring to FIG. 5, in step 510, the processor 120 of the electronic device 101 controls the display 150 to arrange and display a plurality of tags according to each category. More specifically, each of the tags belongs to one of the categories and is arranged according to each category. According to an embodiment of the present invention, the processor 120 determines one of the categories as a highest priority category. For example, the processor 120 may calculate a total sum of hit counts of the tags according to each category, and determine a category corresponding to the largest total sum as the highest priority category. Alternatively, the processor 120 identifies the tag having the largest hit count among the tags and determines the category including the corresponding tag as the highest priority category. The processor 120 may arrange tags included in the highest priority category in the first column, and arrange tags included in other categories in the following columns.

In step 515, the processor 120 receives a selection of one of a plurality of displayed tags from an input device. For example, the processor 120 may receive a touch input (e.g., a tap) for one of the plurality of displayed tags from a touch panel. Further, the processor 120 may receive voice data through a speaker, convert the received voice data into text, and, if the converted text matches one of the displayed tags, determine the matched tag as a tag selected by the user. The processor 120 updates a hit count of the selected tag.

In step 520, the processor 120 acquires tags related to the selected tag from a predetermined database (e.g., the tag DB 252). For example, the processor 120 may search for information regarding contents related to the selected tag in the index DB 251 and search for tags related to the found information on the contents in the tag DB 252.

In step 525, the processor 120 acquires a node weight of each of different categories from a predetermined database (e.g., the correlation information in the node DB 253) based on the category including the selected tag. For example, referring to FIG. 6, the category including the selected tag may be the location (L) category, and processor 120 may acquire 7, 6, 4, and 0 assigned to nodes 610, 620, 630, and 640, respectively, from the correlation information in the node DB 253. According to an embodiment of the present invention, the node weight may be a vector value having a direction and size. More specifically, the node weight may be a value indicating how many times the tag included in a second category is selected immediately after the tag included in a first category is selected. Accordingly, the number "7" assigned to the node 610 indicates the number of times by which the tag included in the "event" is selected after the user selects the tag included in the "location". The number "6" assigned to the node 620 indicates the number of times by which the tag included in the "scene type" is selected after the tag included in the "location" is selected, and the number "4" assigned to the node 640 indicates the number of times by which the tag included in the "person" is selected after the tag included in the "location" is selected. Further, the number "0" assigned to the node 640 indicates no repeated selection of the tag included in the "location" after the tag included in the "location" is selected.

In step 530, the processor 120 determines the rank of the categories based on the node weights. According to an embodiment of the present invention, the "location" category including the selected tag is determined as the first priority (first rank) and the ranks of the other categories may be determined in a descending order of node weights. More specifically, "event" is determined to hold the second rank based on the node weight "7" of node 610, "scene type" is determined to hold the third rank based on the node weight "6" of node 620, and "person" is determined to hold the fourth rank based on the node weight "4" of node 630.

In step 535, the processor 120 re-arranges the selected tag and the tags related to the selected tag according to the determined ranks and display the re-arranged tags on the display 150. For example, tags included in "location" (first rank) are arranged in the first column. Next, tags included in "event" (second rank) are arranged in the second column. Tags included in "scene type" (third rank) are arranged in the third column. Tags included in "person" (fourth rank) are arranged in the fourth column. The tags in each column may also be arranged in an order of hit count size.

In step 540, the processor 120 receives a selection of one of the re-arranged tags from the input device. For example, the processor 120 may receive a touch input (e.g., a tap) for one of the re-arranged tags from the touch panel. Further, the processor 120 may receive voice data through the speaker, convert the received voice data into text, and, if the converted text matches one of the re-arranged tags, determine the matched tag as a tag selected by the user. The processor 120 updates a hit count of the selected tag.

In step 545, the processor 120 acquires tags related to the selected tag from the tag DB 252. The processor 120 may also update a weight of the corresponding node in response to the selection of one of the re-arranged tag. For example, if the tag included in the event category is selected after the tag included in the location category is selected, the weight "7" assigned to the node 610 is updated to be the weight "8".

In step 550, the processor 120 determines whether the selected tags belong to the same category (i.e., the category arranged in the first column).

If the tags do not belong to the same category, the processor 120 acquires the node weight of each of the other categories based on the category including the recently selected tag (i.e., the tag selected in step 540) from the a correlation information in the node DB 253 in step 555. The category including the selected tag in step 520 may be excluded, since this category is arranged in the first column. For example, referring to FI. 6, the category including the tag selected in step 540 may be the event (E) category, and processor 120 may acquire the node weights "5" and "4" assigned to the nodes 650 and 660, respectively, from the correlation information in the node DB 253. Further, if the tags do not belong to the same category, the processor 120 may update the node weight of the category including the selected tag at a later time.

In step 560, the processor 120 re-determines the ranks of the categories based on the acquired node weights. According to an embodiment of the present invention, the ranks of the categories may be re-determined in an order of the large node weight. For example, the processor 120 may identify that the node weight assigned to the node 650 is larger than the node weight assigned to the node 660, and change the ranks such that the person category ranks higher than the scene type category.

In step 565, the processor 120 re-arranges the selected tag and the tags related to the selected tag according to the re-determined ranks and display the re-arranged tags on the display 150. For example, tags included in the location, which is ranked first, are arranged in the first column. Next, tags included in the event, which is ranked second, are arranged in the second column. Tags included in the person category, which has been changed from the fourth rank to the third rank, are arranged in the third column. Tags included in the scene type category, which has been changed from the third rank to the fourth rank, are arranged in the fourth column.

If the tags belong to the same category, based on a result of the determination of step 550, the processor 120 displays the selected tags and the tags related to the selected tags on the display 150 without re-arrangement of the categories, in step 570.

According to some embodiments of the present invention, the tags may be arranged in rows. For example, the tags included in the location category may be arranged in a first row, while the tags included in the other categories are arranged in corresponding rows according to the ranks of the corresponding categories.

Figure 7:
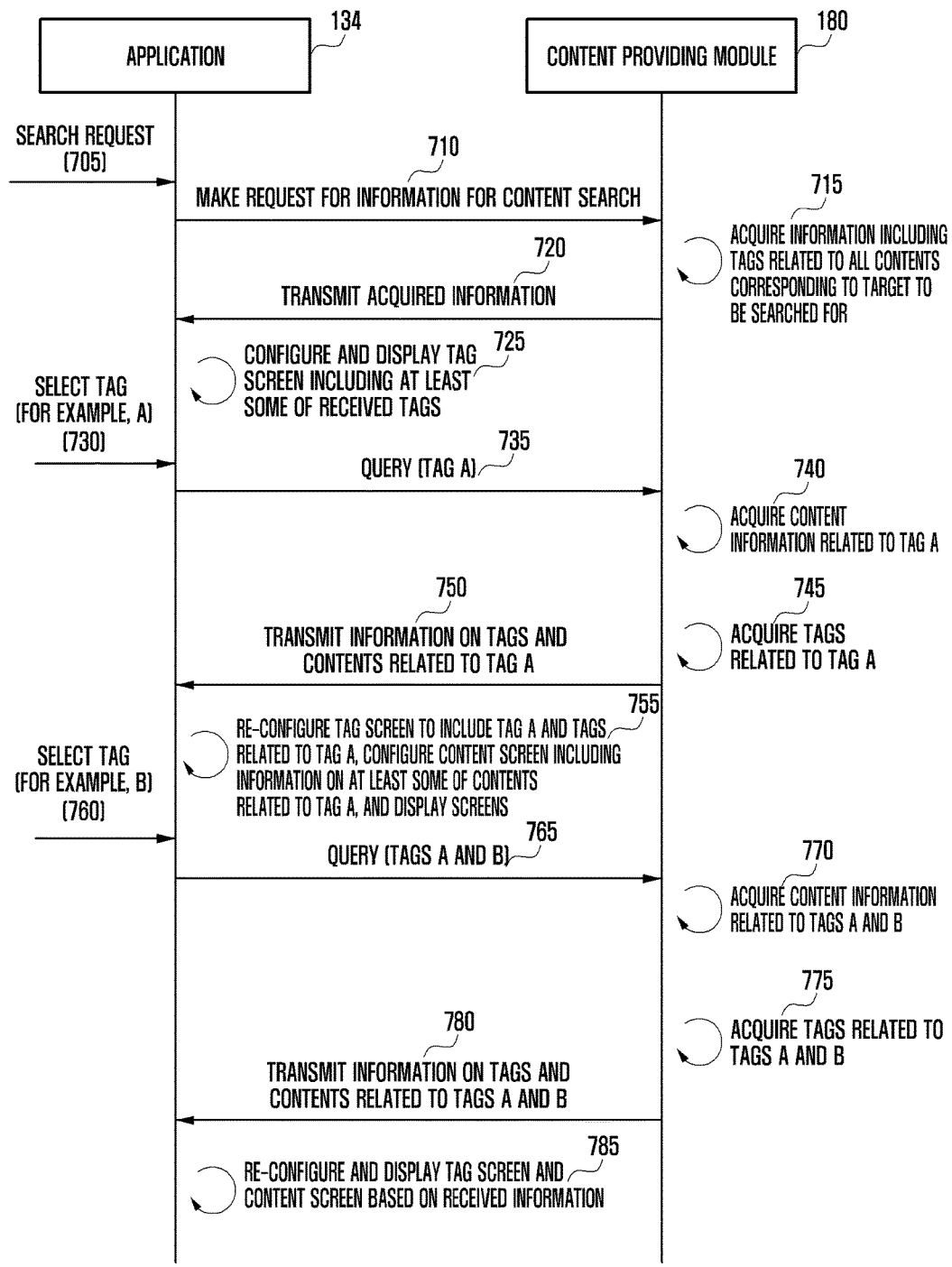
FIG. 7 is a flowchart illustrating a content search method according to an embodiment of the present invention.

FIG. 7 is a flowchart illustrating a content search method according to an embodiment of the present invention.

Referring to FIG. 7, in step 705, the application 134 receives a search request from the user through the input device.

In step 710, the application 134 requests the content providing module 180 for information for a content search, in response to the search request.

In step 715, the content providing module 180 acquires information including tags related to all contents corresponding to a target to be searched for, from a predetermined database (e.g., the index DB 251 or the tag DB 252), in response to a tag request. The acquired information includes a category of each tag and information regarding at least some of the contents.

In step 720, the content providing module 180 transmits the acquired information to the application 134. According to an embodiment of the present invention, the content providing module 180 configures the acquired tags in a predetermined data structure (e.g., the tag table 320) and returns the tags to the application 134 (e.g., the content request module 170). According to an embodiment of the present invention, the content providing module 180 classifies the tags according to each category, arranges the tags in order according to size of the hit count, and transmits the tags to the application 134. Further, the content providing module 180 determines a highest priority category, determines ranks of the other categories according to an order of the node weight size, arranges the categories in a descending order according to the determined ranks, and transmits the categories to the application 134.

In step 725, the application 134 configures a tag screen including at least some of the received tags (e.g., a predetermined number of tags having the largest hit counts) and displays the tag screen on the display. According to an embodiment of the present invention, the tag may be more preferentially included in the tag screen as the degree of the tag increases.

In step 730, the application 134 receives a selection of a tag (e.g., tag A) from the user through the input device.

In step 735, the application 134 asks the content providing module 180 about information related to tag A in response to the selection of tag A.

In step 740, the content providing module 180 acquires content information (e.g., URIs) related to tag A from the index DB 251, in response to the query of tag A. The content providing module 180 may also configure the acquired content information in a predetermined data structure (e.g., the content table 310).

In step 745, the content providing module 180 acquires tags related to tag A from the tag DB 252. The content providing module 180 may also configure tag A and the acquired tags in a predetermined data structure (e.g., the content table 320). The tags acquired in step 745 are tags related to selected tag A, and the tags acquired by step 715 may include tags that are not related to selected tag A. Accordingly, the number of tags acquired by step 745 may be less than the number of tags acquired by step 715. According to some embodiments of the present invention, step 745 may be processed before 740. Further, steps 740 and 745 may be processed at the same time (i.e., multi-processed).

In step 750, the content providing module 180 transmits the tags related to tag A and information regarding contents related to tag A to the application 134. According to an embodiment of the present invention, the information may be configured as a stacked cursor and transmitted to the application 134.

In step 755, the application 134 re-configures the tag screen to include the selected tag A and the tags related to tag A (i.e., exclude the tags that are not related to tag A, from the tag screen), configures a content screen to include information on at least some of the contents related to tag A, and displays the screens on the display.

In step 760, the application 134 receives selection of a tag (e.g., tag B) from the user through the input device.

In step 765, the application 134 requests the content providing module 180 for information related to tag A and tag B in response to the selection of tag B.

In step 770, the content providing module 180 acquires content information related to tag A and tag B from the index DB 251 in response to the request for information related to tags A and B. The content providing module 180 may also re-configure the content table 310 by using the acquired content information. The content information acquired by step 770 is related to both tag A and tag B, and the content information acquired by operation 740 is be related to tag A. Accordingly, the number of contents corresponding to the content information acquired by operation 770 may be less than the number of contents corresponding to the content information acquired by operation 740.

In step 775, the content providing module 180 acquires tags related to tags A and B from the tag DB 252. The content providing module 180 may also re-configure the tag table 320 by using the acquired tags.

In step 780, the content providing module 180 transmits the tags related to tags A and B and the information on the contents related to tags A and B to the application 134. According to an embodiment of the present invention, the stacked cursor may be re-configured and transmitted to the application 134.

In step 785, the application 134 re-configures the tag screen and the content screen based on the received information and displays the re-configured screens on the display.

According to some embodiments of the present invention, acquisition of the information regarding the contents may be performed when a predetermined condition is met. For example, if the number of selected tags is greater than a predetermined number, the acquisition of the information on the contents may be performed and the information may be transmitted to the application 134 together with the acquired tags.

According to some embodiments of the present invention, if the predetermined condition is met (e.g., if the number of selected tags is larger than the predetermined number), the acquired information regarding the contents may be transmitted to the application 134 together with the acquired tags.

According to various embodiments of the present invention, a method may include: displaying tags; detecting a selection of one of the displayed tags; displaying at least one tag related to the selected tag; and displaying information regarding at least one content related to the selected tag.

According to various embodiments of the present invention, the displaying the at least one tag comprises arranging and displaying a plurality of tags related to the selected tag based on at least one of a hit count of each of the plurality of tags and a node weight, wherein the hit count of a specific tag includes the number of times by which the specific tag has been selected, and wherein the node weight is a value which is assigned to a node indicating a relationship between a specific category and other category and which indicates the number of times by which, after a tag included in the specific category as the selected tag has been selected, a tag included in the other category has been selected.

According to various embodiments of the present invention, the arranging the plurality of tags comprises arranging the plurality of tags in descending order of a hit count of each tag.

According to various embodiments of the present invention, the displaying the one or more tags related to the selected tag comprises: acquiring, based on the specific category including the selected tag, a node weight of each of nodes each of which indicates a relationship between the specific category and each of other categories; determining a rank of the specific category including the selected tag and a rank of each of the other categories based on the node weight of each of the nodes; and arranging and displaying the at least one related to the selected tag based on the determined rank of a category corresponding to each tag.

According to various embodiments of the present invention, the determining the ranks comprises determining the rank of the category including the at least one selected tag as a first rank and determining the ranks of the at least one other category sequentially in descending order of node weight of each category.

According to various embodiments of the present invention, the method may further include updating at least one of a node weight of the category including the at least one selected tag and a hit count of the at least one selected tag.

According to various embodiments of the present invention, the displaying the at least one tag related to the at least one selected tag comprises visually distinguishing the at least one selected tag from the at least one tag related to the at least one selected tag.

According to various embodiments of the present invention, the method may further include ending, after detecting the selection of the at least one tag, displaying of tags that are not related to the at least one selected tag, among a plurality of tags.

According to various embodiments of the present invention, the displaying at least one tag related to the at least one selected tag comprises: displaying at least one of the at least one selected tag and the at least one tag related to the selected tag on a part of a screen; and additionally displaying the at least one selected tag on another part of the screen.

According to various embodiments of the present invention, the displaying the at least one tag comprises: displaying information regarding at least one category; receiving a selection of at least one of the at least one category; and displaying a tag belonging to the selected at least one category. According to an embodiment of the present invention, various User eXperiences (UXs) may be provided to the user.

Figure 8:
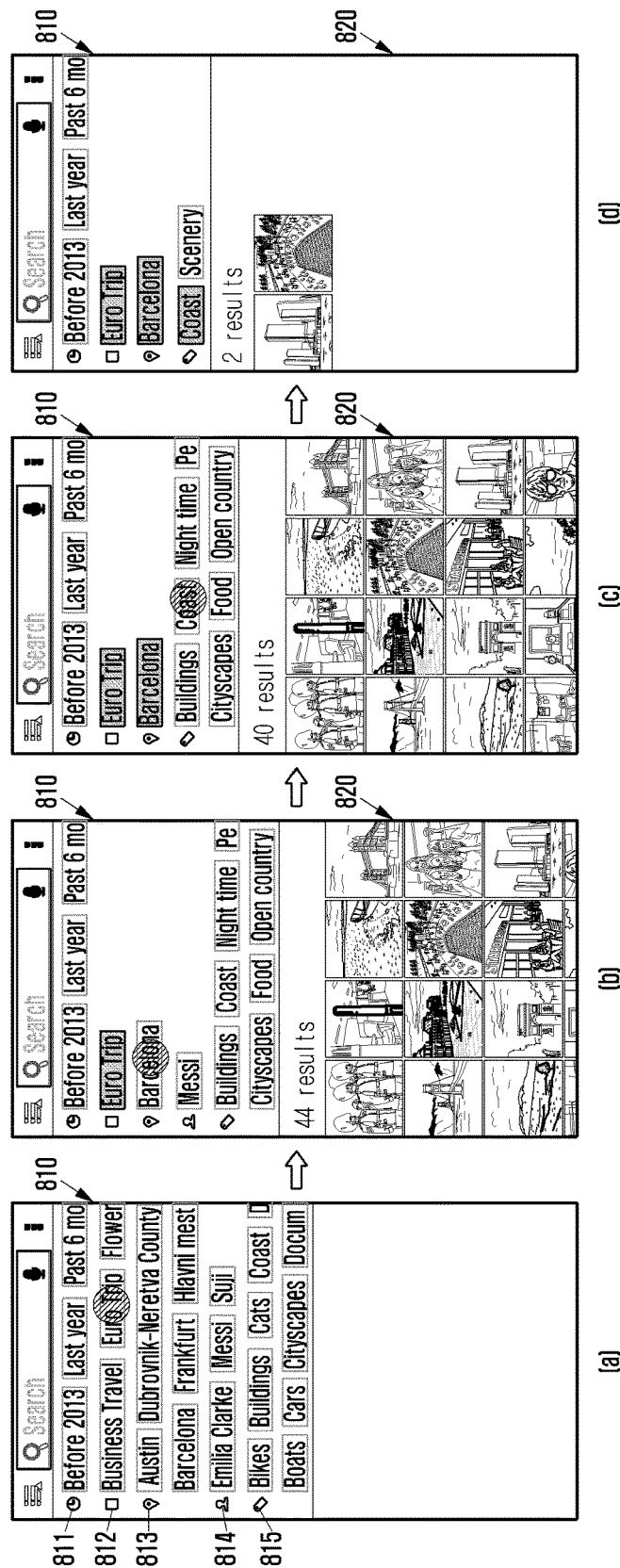
FIG. 8 illustrates user interface screens for providing a user experience according to an embodiment of the present invention.

FIG. 8 illustrates user interface screens for providing a user experience according to an embodiment of the present invention.

Referring to FIG. 8(*a*), according to an embodiment of the present invention, the display 150 of the electronic device 101 displays a tag screen 810. An indicator (e.g., an icon) indicating a category of a tag is arranged and displayed together with corresponding tags. For example, icons 811 to 815 indicating "time", "event", "location", "person", and "scene type" categories, respectively, are displayed on the tag screen 810. In the present example, the "time" category is determined as a highest priority category, and the corresponding icon 811 is displayed in a first line together with the corresponding tags. Other categories are arranged in a descending order of node weight. More specifically, the other categories may be arranged below the "time" category in a descending order of correlation with the "time" category.

In the present example, tags in each row are arranged in a descending order. More specifically, the tags may be arranged such that the tag having a higher hit count is closer to the corresponding icon. For example, since a "Before 2013" tag has a larger hit count than the hit count of a "Last year" tag in the "time" category, the "Before 2013" tag is arranged closer to the icon 811 corresponding to the indicator.

In the present example, only some of the tags corresponding to each category are displayed. The other tags may be displayed according to a user input. For example, when an object of the user (e.g., a finger or pen) touches any row, the user may move the object in a direction (that is, a left direction) in which the corresponding icon is displayed. In response to the user gesture, the processor 120 drags tags of the corresponding category in a left direction. For example, in the "scene type" category, the display of tags "Bikes" and "Boats" may disappear, and a tag having a name of "Night time" may be newly displayed.

Referring to FIGS. 8(a) and (b), the user may select one tag on the tag screen 810. For example, the user may select a "Euro Trip" tag illustrated in FIG. 8(a) by an object (e.g., a finger or pen). The processor 120 receives a user's selection through the touch panel. In response to the user's selection, the processor 120 re-configures the tag screen 810 and display the re-configured tag screen 810 on the display 150 as illustrated in FIG. 8(b). According to an embodiment of the present invention, the processor 120 searches for tags related to the selected "Euro Trip" tag in the tag DB 252. The processor 120 searches for content information related to the selected "Euro Trip" tag in the index DB 251. Based on a result of the search, for example, a "Business Travel" tag and a "Flower festival" tag are not related to the selected tag, so that the "Business Travel" tag and the "Flower festival" tag are excluded from the "event" category. The "festival" may be a part of the tag, which is not displayed due to lack of the space. That is, only "Flower" of "Flower festival" may be displayed.

For the same reason, tags, which are not related to the selected tag, may be excluded from each category.

According to an embodiment of the present invention, the selected tag may be distinguished from other tags (i.e., tags that are not selected by the user). For example, the selected "Euro Trip" tag may be highlighted compared to other tags as illustrated in FIG. 8(b). Further, based on various tag attributes (e.g., a color, a character style, a character size, and the like), the selected tag may be distinguished from other tags.

Referring to FIG. 8(b), the processor 120 configures the content screen 820 and displays the content screen 820 on the display 150. For example, the processor 120 may display information "44 results" indicating the number of contents related to the selected tag "Euro Trip" on the display 150. The processor 120 may display information corresponding to some of the related contents (e.g., thumbnails) on the display 150.

The user selects one more tag on the re-configured tag screen 810. For example, the user may tap a "Barcelona" tag illustrated in FIG. 8(b) by an object. The processor 120 receives a user's selection through the touch panel. Referring to FIG. 8(c), in response to the user's selection, the processor 120 re-configures the tag screen 810 and displays the re-configured tag screen 810 on the display 150 as illustrated in FIG. 8(c). That is, the processor 120 may search for tags and content information related to the selected tags "Euro Trip" and "Barcelona". Based on a result of the search, tags, which are not related to the selected tags, may be excluded from each category. The selected tag "Barcelona" as well as the previously selected tag "Euro Trip" may be distinguished from other tags as illustrated in FIG. 8(c).

Referring to FIG. 8(c), the processor 120 re-configures the content screen 820 and display the content screen 820 on the display 150. For example, the processor 120 displays the information "40 results" indicating the number of contents related to the selected tags "Euro Trip" and "Barcelona" on the display 150. Further, although not selected by the user yet, "Before 2013", "Last year", "Past 6 mo(nths)" and Buildings" included in the tag screen 810 are tags related to at least one of the 40 contents.

The user selects one more tag, for example, "Coast" on the re-configured tag screen 810. The processor 120 receives the selection of "Coast" from the touch panel. Referring to FIG. 8(d), the processor 120 re-configures the tag screen 810 and the content screen 820 in response to the selection of "Coast". Based on a result of the re-configuration, tags, which are not related to the selected tags, "Euro Trip", "Barcelona", and "Coast", are excluded from the respective categories. A category that is not related to the selected tags (e.g., the "scene type" category) may also be excluded. Content information related to the tags, "Euro Trip", "Barcelona", and "Coast", which have been selected so far, may be displayed on the content screen 820. Further, information "2 results" indicating the number of related contents is displayed.

According to some embodiments of the present invention, a tag belonging to any category (e.g., the time category) among the categories is fixedly displayed without any correlation with the selected tags.

FIG. 9 illustrates user interface screens for providing a user experience according to another embodiment of the present invention.

Referring to FIG. 9(a), the display 150 displays an input box 910. The processor 120 receives text (e.g., "Gang") from the user through the input box 910. The processor 120 acquires tags related to the text "Gang" (e.g., tags having a name, which begins with "Gang") from a predetermined database (e.g., the tag DB 252). The processor 120 also acquires information on each of the acquired tags (e.g., the number of contents related to the corresponding tags) from the tag DB 252.

The processor 120 displays a tag screen 920 including at least some of the acquired tags on the display 150. The tags are displayed on the tag screen 920 in descending order of hit counts. "Gangwon-do trip", "Gang ji-hyeon", "Gang dong-won", "Gangnam station", and "Gangneung beach" illustrated in FIG. 9(a) correspond to tags that are sequentially arranged in descending order of hit counts.

Each tag, according to various embodiments of the present invention, may include information on contents related to the corresponding tag. For example, the number "112", "12", "42", "66", or "23" illustrated in FIG. 9(a) indicates the number of contents related to the corresponding tags.

The tag screen 920 may include information on at least one of the identified contents. For example, "Gangnam style.mp3" illustrated in FIG. 9(a) may indicate an audio file having a name that begins with "Gang".

The user selects at least one tag on the tag screen 920. For example, the user may tap a tag "Gang dong-won" illustrated in FIG. 9(a) by an object. Referring to FIG. 9(b), in response to the user's selection for the "Gang dong-won", the processor 120 controls the display 150 to display the selected tag "Gang dong-won" in the input box 910 instead of the input text "Gang". According to some embodiments of the present invention, the selected tag is displayed on a part the screen other than the input box 910 (e.g., the lower side of the content screen 930). The processor 120 acquires tags related to the selected tag "Gang dong-won" from the tag DB 252. The processor 120 re-configures the tag screen 920 to include the acquired tags and display the re-configured tag screen 920. For example, "Gangneung beach", "Suwon station", "COEX", "summer trip", and "2014 motor show" illustrated in FIG. 9(b) are selected and included in the tag screen 920. Next to each tag, the number of contents related to the corresponding tag may be displayed. For example, the number "13" illustrated in FIG. 9(b) indicates that there are 13 content items related to the tag "Gangneung beach".

Referring back to FIG. 9(b), the processor 120 identifies contents related to the selected tag "Gang dong-won" in the index DB 251 and displays a content screen 930 including information regarding at least one of the identified contents (e.g., thumbnail) on the display 150. The tag screen 920 is displayed above the content screen 930.

The user taps the tag "Gangneung beach" on the tag screen 920 as illustrated in FIG. 9(b) with an object. Referring to FIG. 9(c), in response to the user's selection for the "Gangneung beach", the processor 120 controls the display 150 to additionally display the selected tag "Gangneung beach" in the input box 910. The processor 120 identifies contents related to the tags "Gang dong-won" and "Gangneung beach" in the index DB 251 and controls the display 150 to display information regarding at least one of the identified contents on the content screen 930.

FIGS. 10A to 10I illustrate user interface screens for providing a user experience according to another embodiment of the present invention.

Figure 10A:
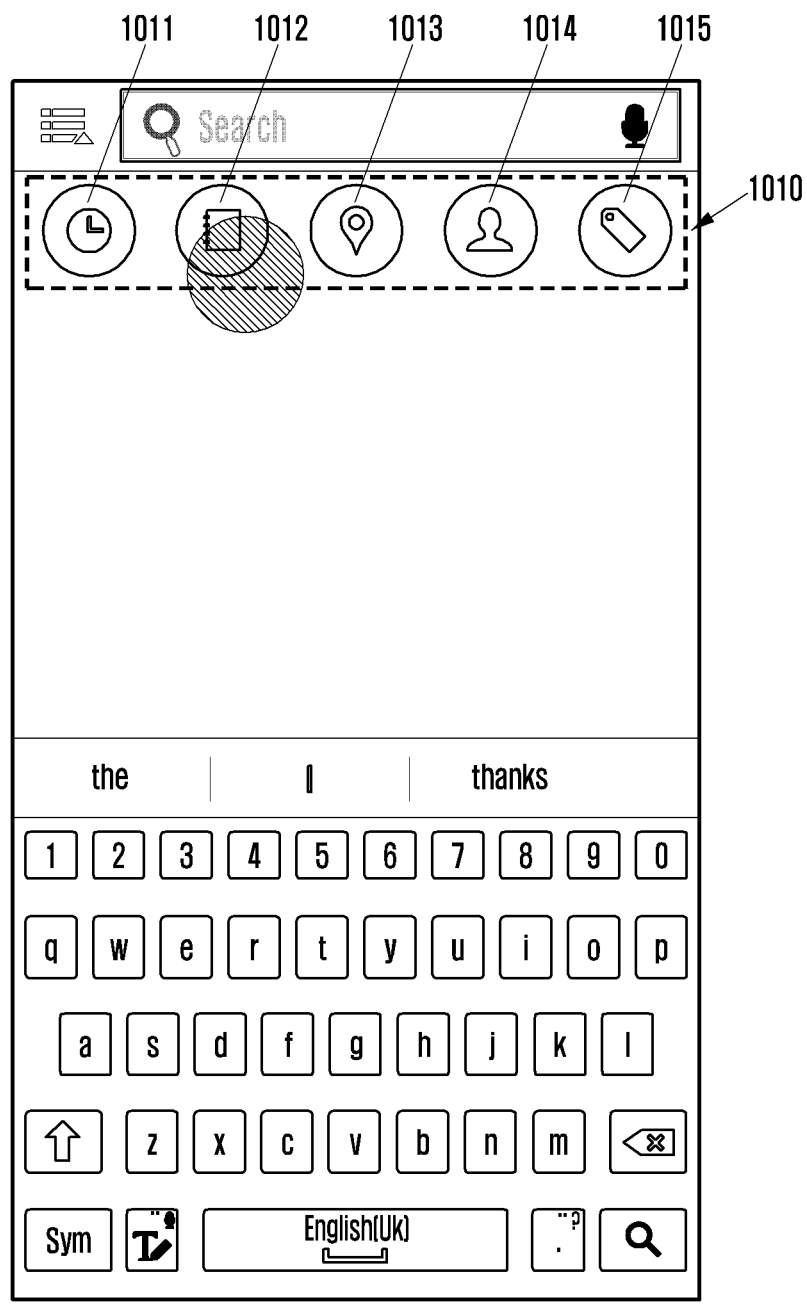
FIGS. 10A to 10I illustrate user interface screens for providing a user experience according to another embodiment of the present invention.

Referring to FIG. 10A, according to an embodiment of the present invention, the display 150 displays a category list 1010. According to an embodiment of the present invention, the category list 1010 includes an icon 1011 corresponding to the time category, an icon 1012 corresponding to the event category, an icon 1013 corresponding to the location category, an icon 1014 corresponding to the person category, and an icon 1015 corresponding to the scene type category.

Figure 10B:
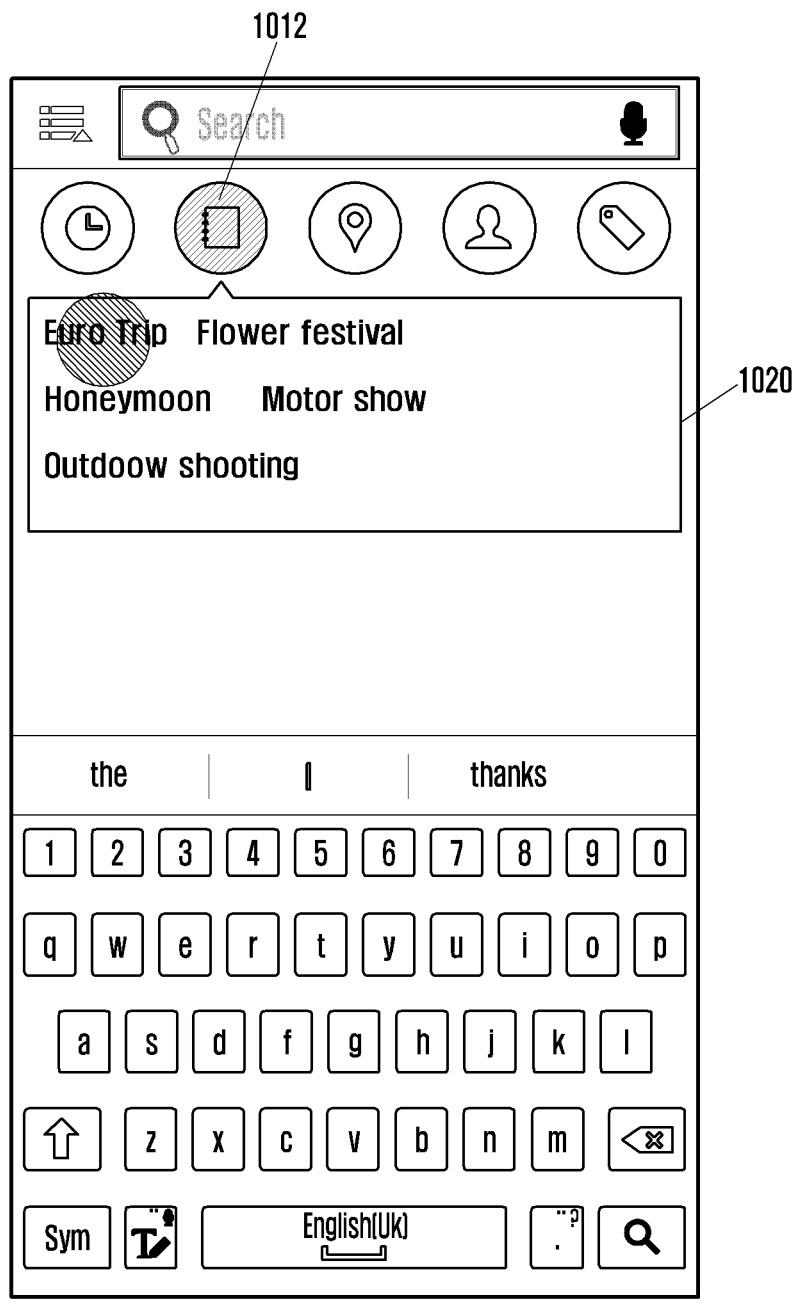

Referring to FIGS. 10A and 10B, the processor 120 receives a user's selection for the event icon 1012 from the touch panel. In response to the selection of the event icon 1012, the processor 120 controls the display 150 to display an event tag screen 1020 including tags corresponding to the event category. The processor 120 may receive selection of one (e.g., "Euro Trip" tag) of the tags of the event tag screen 1020 from the touch panel.

Figure 10C:
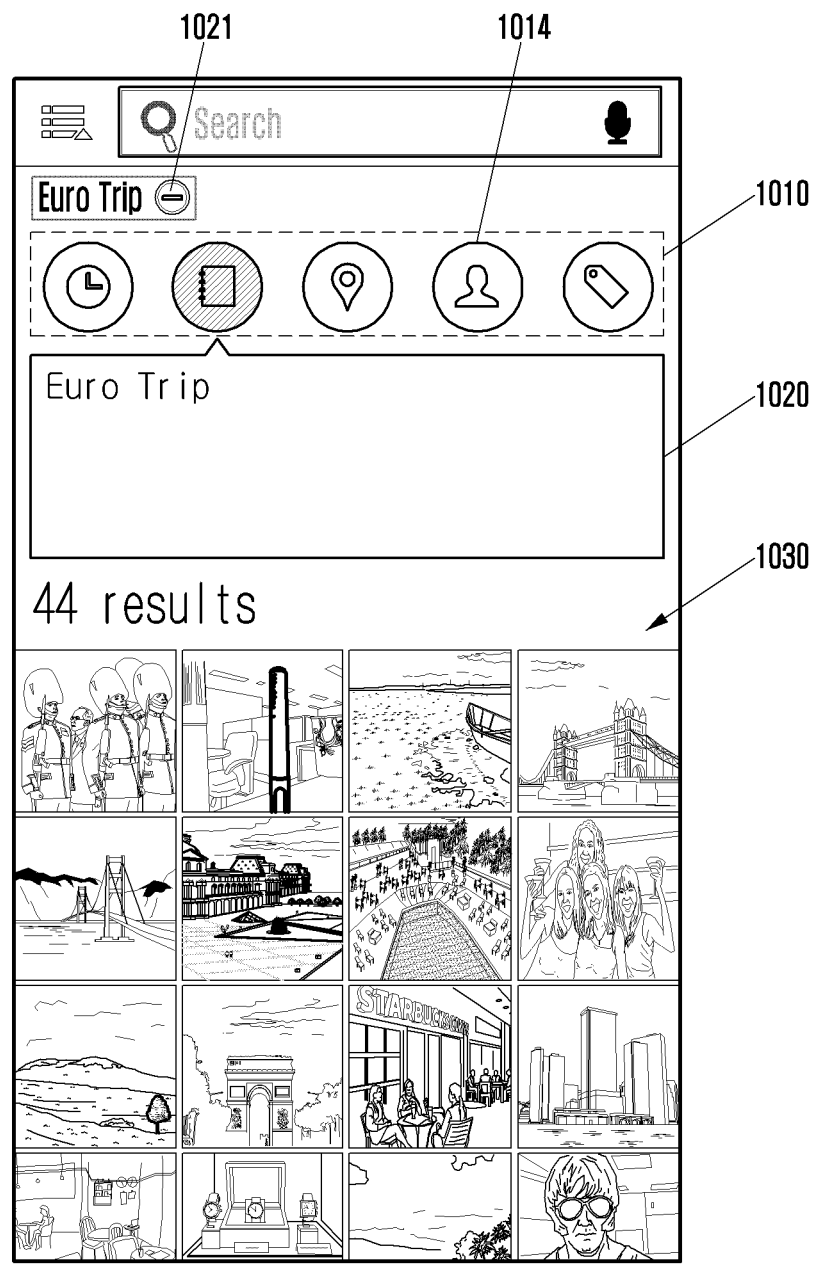

Referring to FIG. 10C, the processor 120 acquires tags related to the selected tag "Euro Trip" tag from the tag DB 252. According to an embodiment of the present invention, in the event category, not all tags are related to "Euro Trip" and thus may be deactivated (e.g., all tags except for "Euro Trip" may be excluded from the event tag screen 1020 as illustrated in FIG. 10C). Further, the selected tag may be displayed on the tag screen 1020 and also separately displayed on another part. For example, the selected tag "Euro Trip" is displayed above the category list 1010. According to an embodiment of the present invention, the display 150 may display a cancel button 1021 for canceling the selection of the tag. In response to the selection of the cancel button 1021, the processor 120 may end the separate displaying of the selected tag. Further, according to a control of the processor 120, the display 150 may reconstruct a state of the event tag screen 1020 and display the reconstructed event tag screen as illustrated in FIG. 10B.

Although the event tag screen 1020 is continuously displayed after the tag "Euro Trip" is selected in FIG. 10C, the display of the event tag screen 1020 may automatically end after the tag "Euro Trip" is selected, according to an embodiment of the present invention.

Referring back to FIG. 10C, the processor 120 may identify contents related to the selected tag "Euro Trip" in the index DB 251 and display a content screen 1030 including information on at least one of the identified contents on the display 150. In the present example, the content screen 1030 includes the text "44 results" indicting the number of contents related to the selected tag "Euro Trip".

Figure 10D:
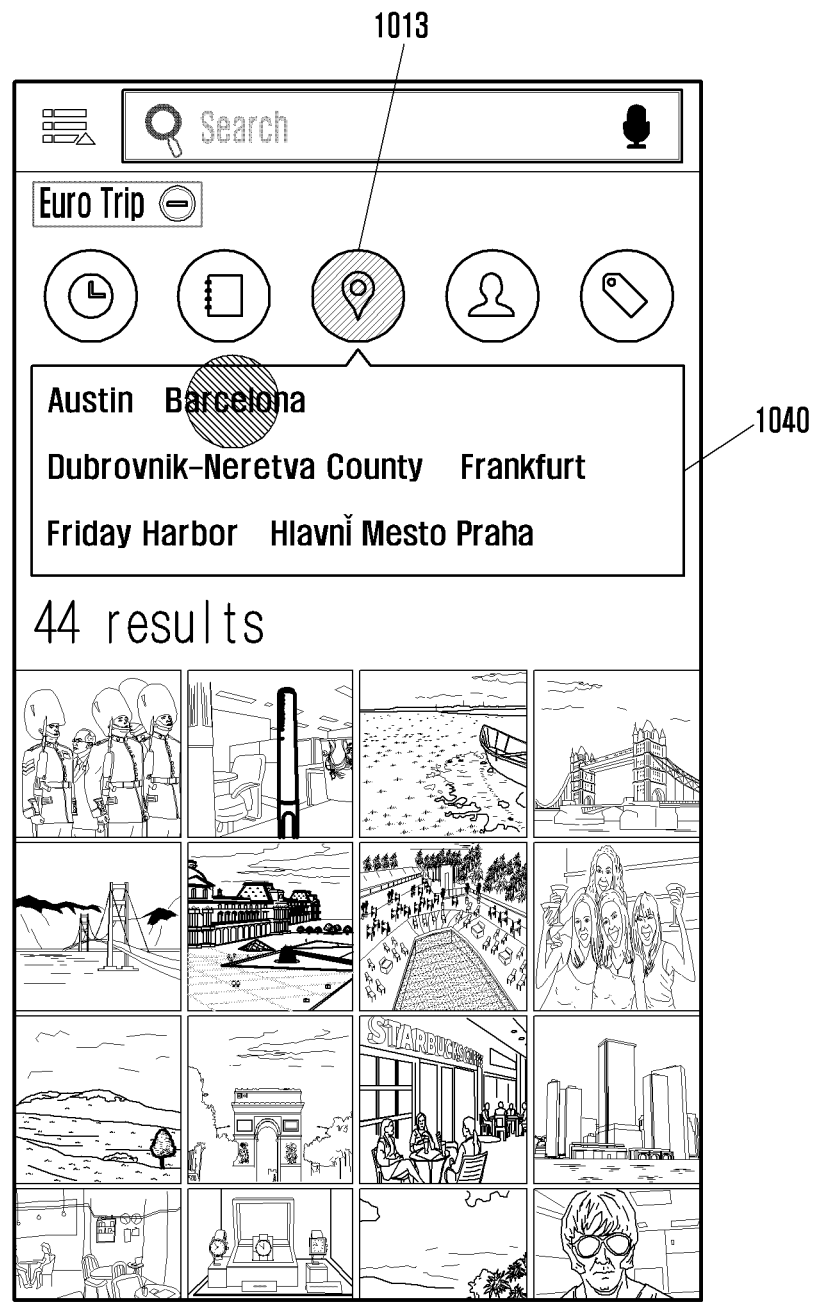

Referring to FIGS. 10C and 10D, the processor 120 may receive a user's selection of the location icon 1013 from the touch panel. In response to the selection of the location icon 1013, the processor 120 controls the display 150 to display a location tag screen 1040 including tags (related to the selected tag "Euro Trip") corresponding to the location category. The processor 120 may receive selection of one (e.g., "Barcelona" tag) of the tags of the location tag screen 1040 from the touch panel.

Figure 10E:
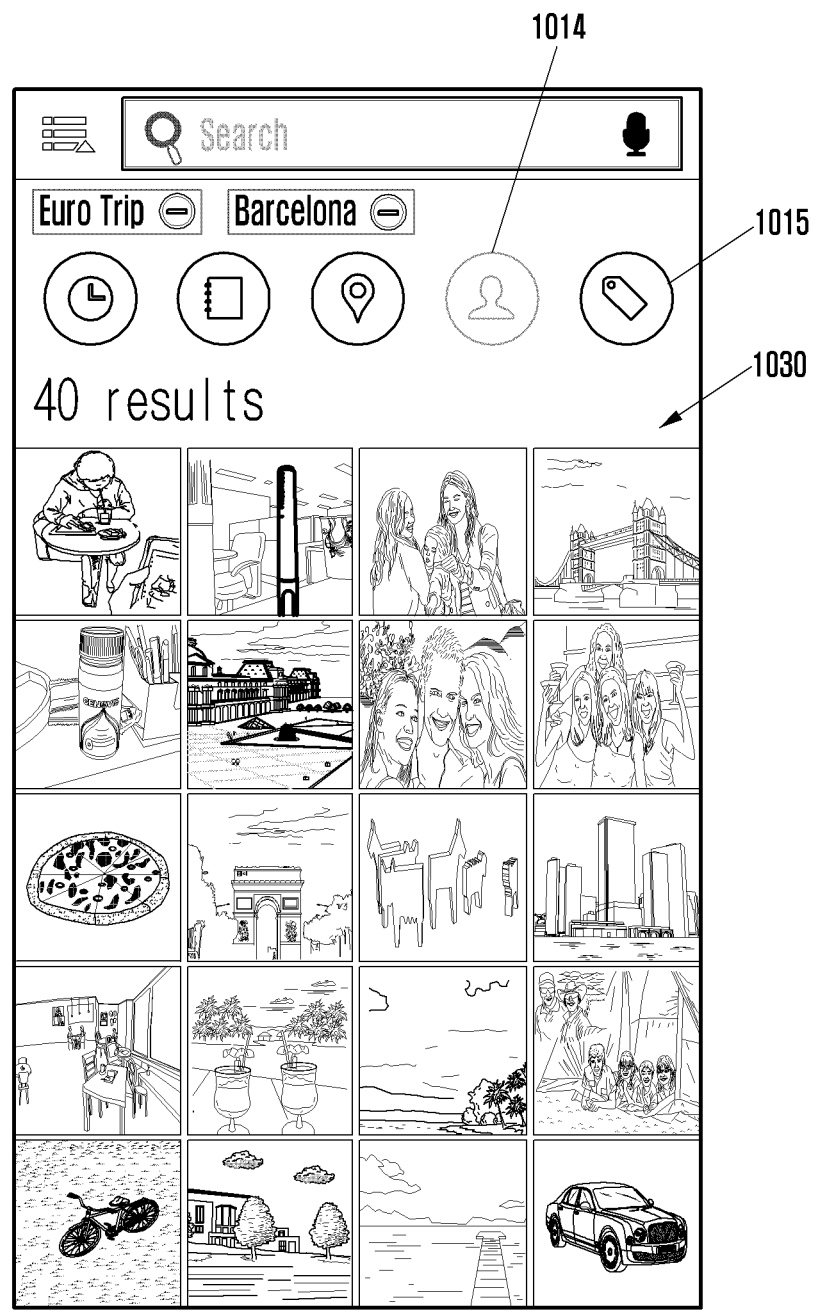

Referring to FIG. 10E, the processor 120 identifies content information related to the selected tags "Euro Trip" and "Barcelona" from the index DB 251 and re-configures the content screen 1030 by using the acquired content information. According to an embodiment of the present invention, the re-configured content screen 1030 includes the text "40 results" indicting the number of contents related to the selected tags "Euro Trip" and "Barcelona". For example, the selected tag "Euro Trip" and "Barcelona" are displayed above the category list 1010. According to an embodiment of the present invention, categories that have no correlation with the selected tags "Euro Trip" and "Barcelona" are deactivated. For example, since the person tag has no correlation with the selected tags, the corresponding icon 1014 is distinguished from other icons. If the user selects the deactivated category (e.g., taps the person icon 1014), the processor 120 may not respond (e.g., not display the corresponding tag screen). Alternatively, the processor 120 may inform the user that the corresponding category has no correlation with the selected tags (e.g., displays a popup window).

Although the display of the location tag screen 1040 automatically ends after the tag "Barcelona" is selected in FIG. 10E, according to an embodiment of the present invention, the location tag screen 1040 may be continuously displayed after the tag "Barcelona". At this time, the location tag screen 1040 may include tags, which correspond to the location category and are related to the selected tags "Euro Trip" and "Barcelona".

Figure 10F:
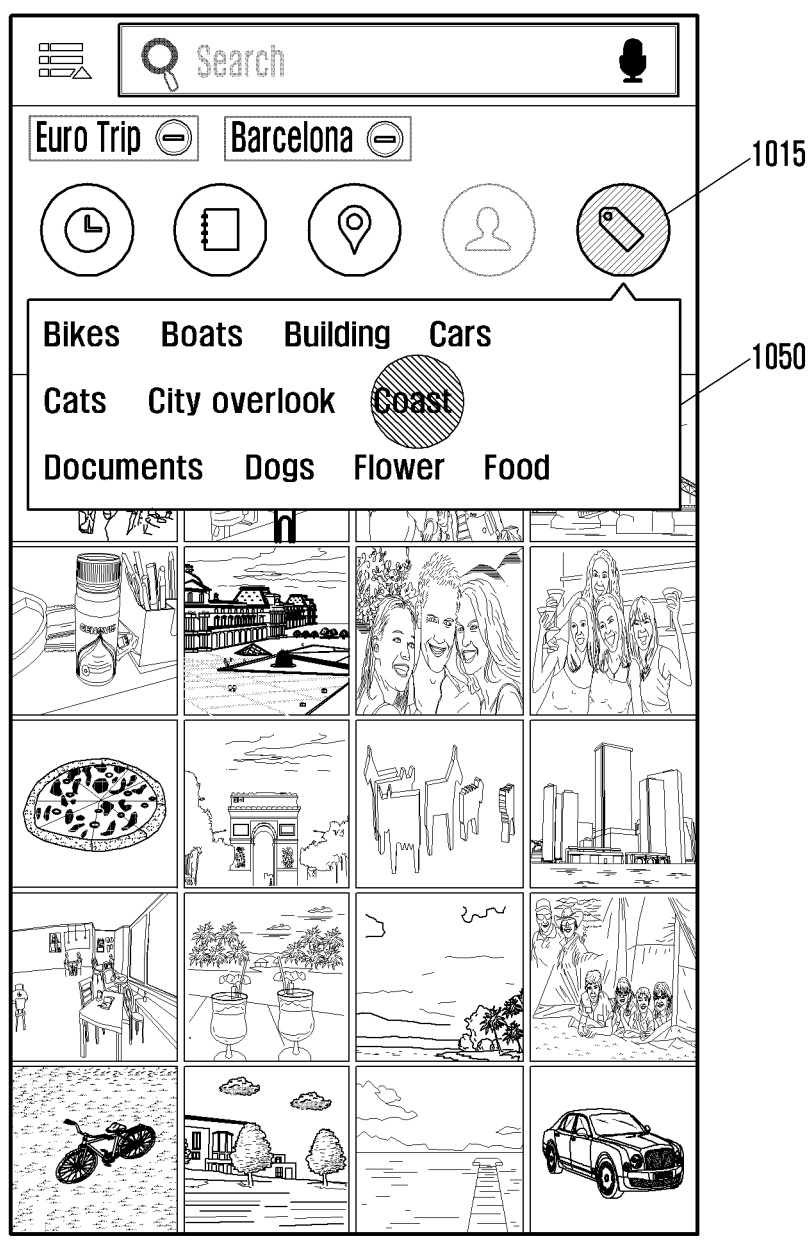

Referring to FIGS. 10E and 10F, the processor 120 may receive a user's selection of the scene type icon 1015 from the touch panel. In response to the selection of the scene type icon 1015, the processor 120 controls the display 150 to display a scene type tag screen 1050 including tags (related to the selected tags "Euro Trip" and "Barcelona") corresponding to the scene type category. The processor 120 may receive selection of one (e.g., "Coast" tag) of the tags of the scene type tag screen 1050 from the touch panel.

Figure 10G:
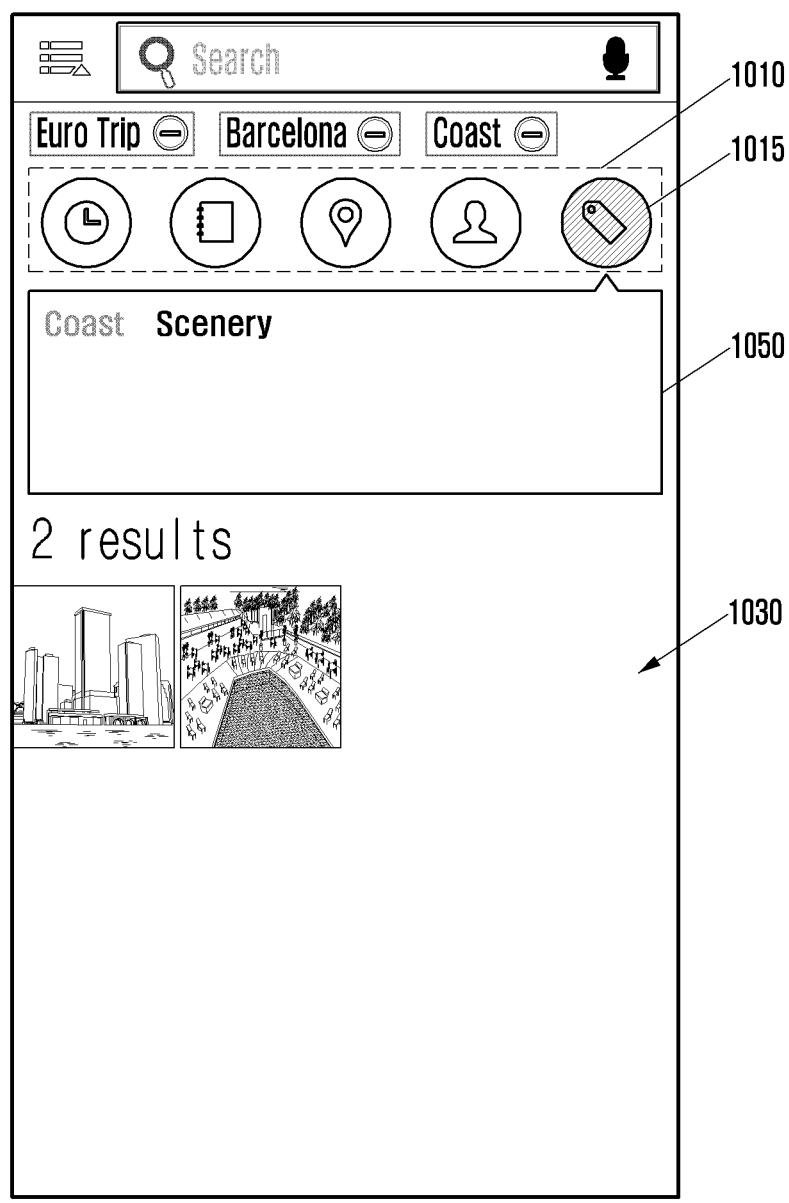

Referring to FIG. 10G, the processor 120 may acquire tags related to the selected tag "Euro Trip", "Barcelona", and "Coast" from the tag DB 252. In the present example, in the scene type category, all remaining tags except for a tag "Scenery" have no correlation with the selected tags and thus are deactivated (e.g., the remaining tags except for the tags "Coast" and "Scenery" are excluded from the scene type tag screen 1050 as illustrated in FIG. 10G). Further, the selected tags "Euro Trip", "Barcelona", and "Coast" may be displayed above the category list 1010.

Referring to FIG. 10G, the processor 120 identifies content information related to the selected tags "Euro Trip", "Barcelona", and "Coast" from the index DB 251 and re-configures the content screen 1030 by using the acquired content information. According to an embodiment of the present invention, the re-configured content screen 1030 may include "2 results" indicting the number of contents related to the selected tags "Euro Trip", "Barcelona", and "Coast".

Figure 10H:
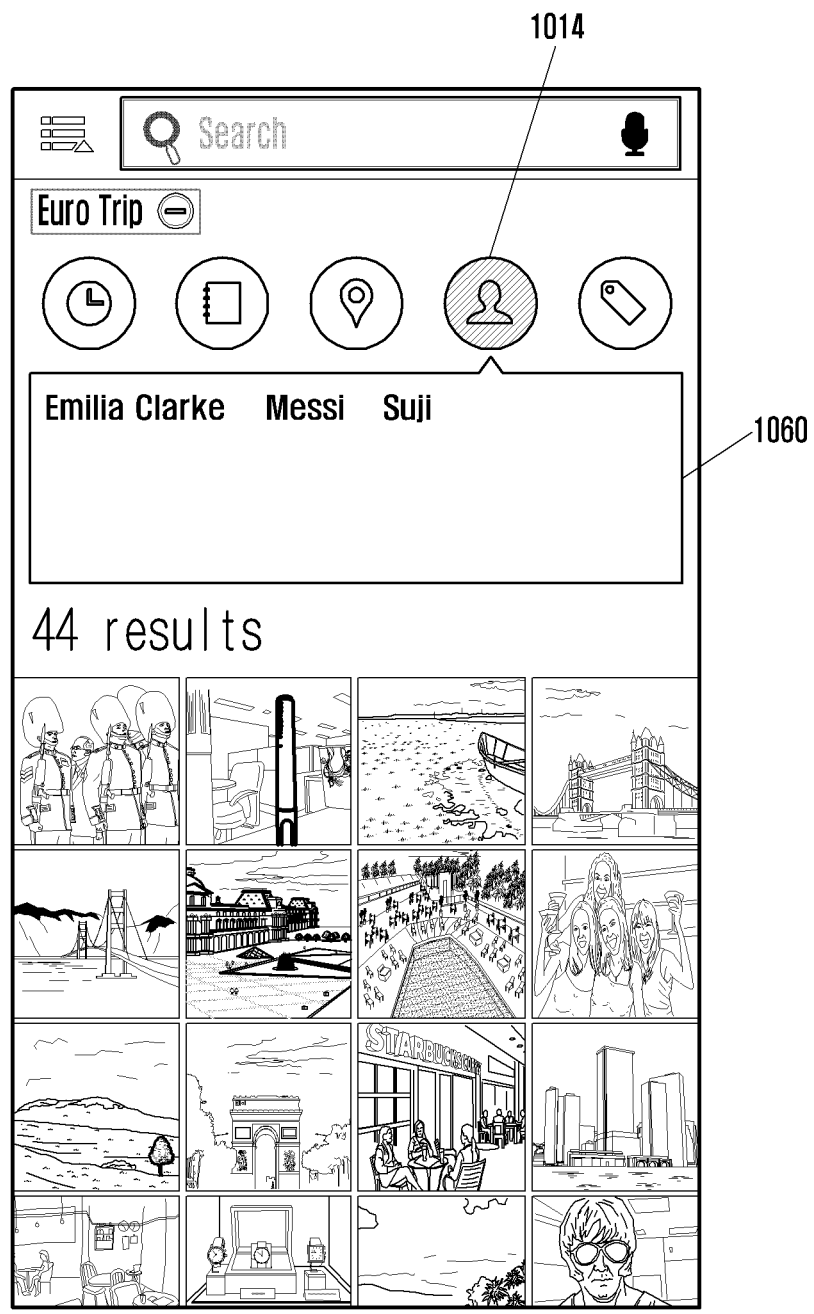

Referring to FIGS. 10C and 10H, the processor 120 may receive a user's selection for the person icon 1014 from the touch panel. In response to the selection of the person icon 1014, the processor 120 may control the display 150 to display a person tag screen 1060 including tags (related to the selected tag "Euro Trip") corresponding to the person category. The processor 120 may receive selection of one (e.g., "Messi" tag) of the tags of the person tag screen 1060 from the touch panel.

Figure 10I:
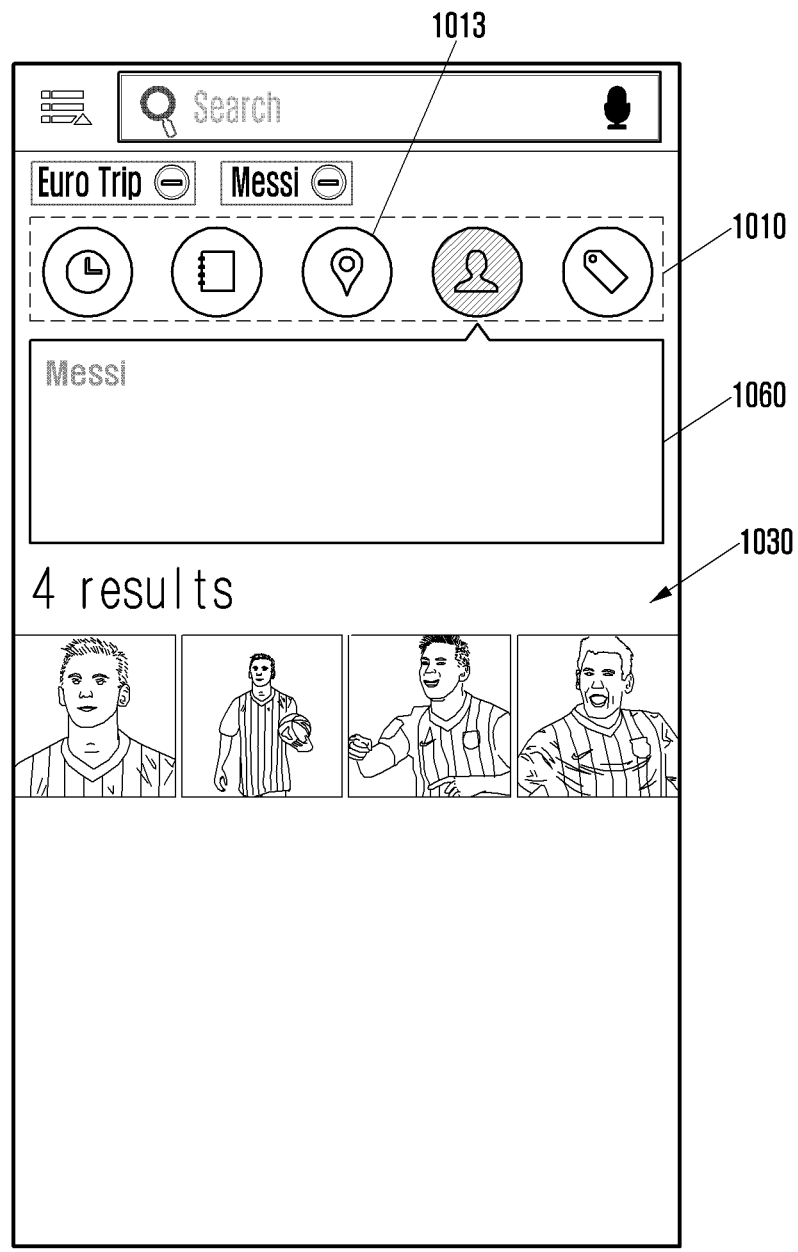

Referring to FIG. 10I, the processor 120 may identify content information related to the selected tags "Euro Trip" and "Messi" from the index DB 251 and re-configure the content screen 1030 by using the acquired content information. According to an embodiment, the re-configured content screen 1030 may include "4 results" indicting the number of contents related to the selected tags "Euro Trip" and "Messi". The selected tags "Euro Trip" and "Messi" may be displayed above the category list 1010. According to an embodiment of the present invention, categories that have no correlation with the selected tags "Euro Trip" and "Barcelona" may be deactivated. For example, since the location tag has no correlation with the selected tags, the corresponding icon 1013 may be distinguished from other icons.

Figure 11:
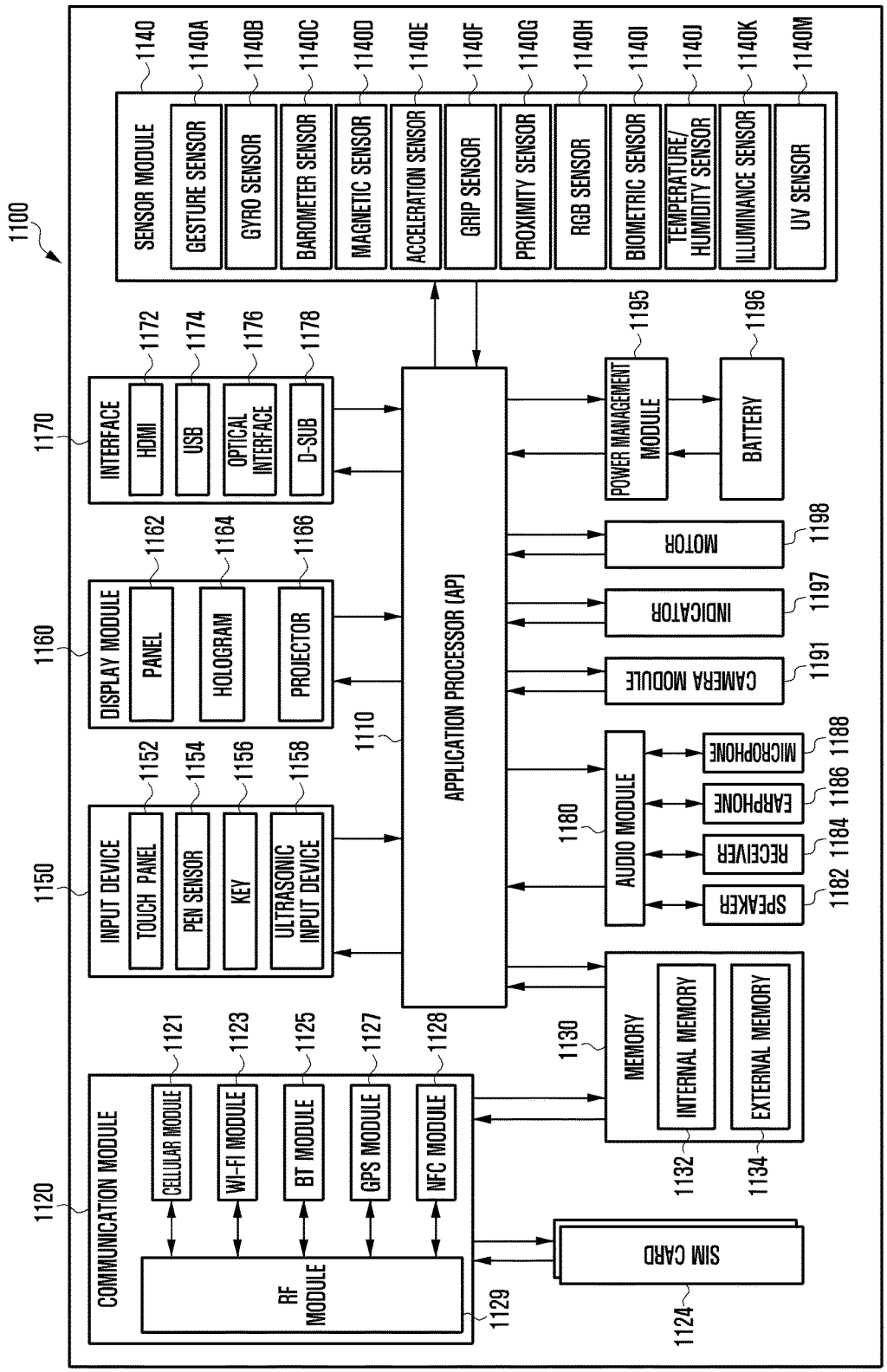
FIG. 11 is a block diagram of an electronic device according to an embodiment of the present invention.

FIG. 11 is a block diagram of an electronic device according to an embodiment of the present invention.

The electronic device 1100 may be configured as, for example, all or portion of the electronic device 101 illustrated in FIG. 1. Referring to FIG. 11, the electronic device 1100 includes at least one Application Processor (AP) 1110, a communication module 1120, a Subscriber Identification Module (SIM) card 1124, a memory 1130, a sensor module 1140, an input device 1150, a display 1160, an interface 1170, an audio module 1180, a camera module 1191, a power managing module 1195, a battery 1196, an indicator 1197, and a motor 1198.

The AP 1110 operates an Operating System (OS) or an application program so as to control a plurality of hardware or software component elements connected to the AP 1110 and execute various data processing and calculations including multimedia data. The AP 1110 may be implemented by, for example, a System on Chip (SoC). According to an embodiment of the present invention, the processor 1110 may further include a Graphic Processing Unit (GPU). The processor 1110 may further include the projecting management module 170.

The communication module 1120 (e.g., communication interface 160) transmits/receives data in communication between different electronic devices (e.g., the electronic device 104 and the server 106) connected to the electronic device 1100 (e.g., electronic device 101) through a network. The communication module 1120 includes a cellular module 1121, a WiFi module 1123, a BlueTooth (BT) module 1125, a Global Positioning System (GPS) module 1127, a Near Field Communication (NFC) module 1128, and a Radio Frequency (RF) module 1129.

The cellular module 1121 provides a voice, a call, a video call, a Short Message Service (SMS), or an Internet service through a communication network (e.g., Long Term Evolution (LTE), LTE-A, Code Division Multiple Access (CDMA), Wideband CDMA (WCDMA), UMTS, WiBro, GSM, etc.). Further, the cellular module 1121 may distinguish and authenticate electronic devices within a communication network by using the SIM card 1124. According to an embodiment of the present invention, the cellular module 1121 performs at least some of the functions that can be provided by the AP 1110. For example, the cellular module 1121 may perform at least some of the multimedia control functions.

According to an embodiment of the present invention, the cellular module 1121 may include a Communication Processor (CP). Further, the cellular module 1121 may be implemented by, for example, an SoC. Although the components such as the cellular module 1121 (e.g., communication processor), the memory 1130, and the power managing module 1195 are illustrated as components separated from the AP 1110 in FIG. 8, the AP 1110 may include at least some (e.g., cellular module 1121) of the aforementioned components in an embodiment.

According to an embodiment of the present invention, the AP 1110 or the cellular module 1121 (e.g., communication processor) may load a command or data received from at least one of a non-volatile memory and other components connected to each of the AP 1110 and the cellular module 1121 to a volatile memory and process the loaded command or data. Further, the AP 1110 or the cellular module 1121 may store data received from at least one of other components or generated by at least one of other components in a non-volatile memory.

Each of the WiFi module 1123, the BT module 1125, the GPS module 1127, and the NFC module 1128 may include, for example, a processor for processing data transmitted/received through the corresponding module. Although the cellular module 1121, the WiFi module 1123, the BT module 1125, the GPS module 1127, and the NFC module 1128 are illustrated as separate blocks separate in FIG. 8, at least some (e.g., two or more) of the cellular module 1121, the WiFi module 1123, the BT module 1125, the GPS module 1127, and the NFC module 1128 may be included in one Integrated Chip (IC) or one IC package according to an embodiment of the present invention. For example, at least some (e.g., the communication processor corresponding to the cellular module 1121 and the WiFi processor corresponding to the WiFi module 1123) of the processors corresponding to the cellular module 1121, the WiFi module 1123, the BT module 1125, the GPS module 1127, and the NFC module 1128 may be implemented by one SoC.

The RF module 1129 transmits/receives data (e.g., an RF signal). Although not illustrated, the RF module 1129 may include, for example, a transceiver, a Power Amp Module (PAM), a frequency filter, a Low Noise Amplifier (LNA), etc. Further, the RF module 1129 may further include a component for transmitting/receiving electronic waves over a free air space in wireless communication, for example, a conductor, a conducting wire, etc. Although the cellular module 1121, the WiFi module 1123, the BT module 1125, the GPS module 1127, and the NFC module 1128 share one RF module 1129 in FIG. 11, at least one of the cellular module 1121, the WiFi module 1123, the BT module 1125, the OPS module 1127, and the NFC module 1128 may transmit/receive an RF signal through a separate RF module according to one embodiment.

The SIM card 1124 includes a Subscriber Identification Module and may be inserted into a slot formed in a particular portion of the electronic device. The SIM card 1124 includes unique identification information (e.g., Integrated Circuit Card IDentifier (ICCID)) or subscriber information (e.g., International Mobile Subscriber Identity (IMSI).

The memory 1130 (e.g., memory 130) may include an internal memory 1132 or an external memory 1134. The internal memory 1132 may include, for example, at least one of a volatile memory (e.g., a Random Access Memory (RAM), a Dynamic RAM (DRAM), a Static RAM (SRAM), a Synchronous Dynamic RAM (SDRAM), etc.), and a non-volatile Memory (e.g., a Read Only Memory (ROM), a One Time Programmable ROM (OTPROM), a Programmable ROM (PROM), an Erasable and Programmable ROM (EPROM), an Electrically Erasable and Programmable ROM (EEPROM), a mask ROM, a flash ROM, a NAND flash memory, an NOR flash memory, etc.).

According to an embodiment of the present invention, the internal memory 232 may be a Solid State Drive (SSD). The external memory 1134 may further include a flash drive (e.g., a Compact Flash (CF), a Secure Digital (SD), a Micro Secure Digital (Micro-SD), a Mini Secure Digital (Mini-SD), an extreme Digital (xD), or a memory stick). The external memory 1134 may be functionally connected to the electronic device 1100 through various interfaces. According to an embodiment of the present invention, the electronic device 1100 may further include a storage device (or storage medium) such as a hard drive.

The sensor module 1140 measures a physical quantity or detects an operation state of the electronic device 1100, and converts the measured or detected information to an electronic signal. The sensor module 1140 includes, for example, at least one of a gesture sensor 1140A, a gyro sensor 1140B, an atmospheric pressure (barometric) sensor 1140C, a magnetic sensor 1140D, an acceleration sensor 1140E, a grip sensor 1140F, a proximity sensor 11400, a color sensor 1140H (e.g., Red, Green, and Blue (RGB) sensor) 1140H, a biometric sensor 1140I, a temperature/humidity sensor 1140J, an illumination (light) sensor 1140K, and a Ultra Violet (UV) sensor 1140M. Additionally or alternatively, the sensor module 1140 may include, for example, an E-nose sensor, an ElectroMyoGraphy (EMG) sensor, an ElectroEncephaloGram (EEG) sensor, an ElectroCardioGram (ECG) sensor, an InfraRed (IR) sensor, an iris sensor, a fingerprint sensor, etc. The sensor module 1140 may further include a control circuit for controlling one or more sensors included in the sensor module 1140.

The input device 1150 includes a touch panel 1152, a (digital) pen sensor 1154, a key 1156, and an ultrasonic input device 1158. For example, the touch panel 1152 may recognize a touch input in at least one type of a capacitive type, a resistive type, an infrared type, and an acoustic wave type. The touch panel 1152 may further include a control circuit. In the capacitive type, the touch panel 1152 can recognize proximity as well as a direct touch. The touch panel 1152 may further include a tactile layer. In this event, the touch panel 1152 provides a tactile reaction to the user.

The (digital) pen sensor 1154 may be implemented, for example, using a method identical or similar to a method of receiving a touch input of the user, or using a separate recognition sheet. The key 1156 may include, for example, a physical button, an optical key, or a key pad. The ultrasonic input device 1158 is a device which can detect an acoustic wave by a microphone 1188 of the electronic device 1100 through an input means generating an ultrasonic signal to identify data and can perform wireless recognition. According to an embodiment of the present invention, the electronic device 1100 receives a user input from an external device (e.g., computer or server) connected to the electronic device 1100 by using the communication module 1120.

The display 1160 (e.g., display 150) includes a panel 1162, a hologram device 1164, and a projector 1166. The panel 1162 may be, for example, a Liquid Crystal Display (LCD) or an Active Matrix Organic Light Emitting Diode (AM-OLED). The panel 1162 may be implemented to be, for example, flexible, transparent, or wearable. The panel 1162 may be configured by the touch panel 1152 and one module. The hologram device 1164 shows a stereoscopic image in the air by using interference of light. The projector 1166 projects light on a screen to display an image. For example, the screen may be located inside or outside the electronic device 1100. According to an embodiment of the present invention, the display 1160 may further include a control circuit for controlling the panel 1162, the hologram device 1164, and the projector 1166.

The interface 1170 includes, for example, a High-Definition Multimedia Interface (HDMI) 1172, a Universal Serial Bus (USB) 1174, an optical interface 1176, and a D-subminiature (D-sub) 1178. The interface 1170 may be included in, for example, the communication interface 160 illustrated in FIG. 1. In addition to, or as an alternative to the above-described elements, the interface 1190 may include, for example, a Mobile High-definition Link (MHL) interface, a Secure Digital (SD) card/Multi-Media Card (MMC), or an Infrared Data Association (IrDA) standard interface.

The audio module 1180 bi-directionally converts a sound and an electronic signal. At least some components of the audio module 1180 may be included in, for example, the input/output interface 140 illustrated in FIG. 1. The audio module 1180 processes sound information input or output through, for example, a speaker 1182, a receiver 1184, an earphone 1186, the microphone 1188 or the like.

The camera module 1191 is a device which can photograph a still image and a video. According to an embodiment of the present invention, the camera module 1191 includes one or more image sensors (e.g., a front sensor or a back sensor), an Image Signal Processor (ISP) (not shown) or a flash (e.g., an LED or xenon lamp).

The power managing module 1195 manages power of the electronic device 1100. Although not illustrated, the power managing module 1195 may include, for example, a Power Management Integrated Circuit (PMIC), a charger Integrated Circuit (IC), or a battery gauge.

The PMIC may be mounted to, for example, an IC or an SoC semiconductor. Methods for charging the electronic device 1100 may be divided into wired and wireless methods. The charger IC charges a battery and prevent over voltage or over current from flowing from a charger. According to an embodiment of the present invention, the charger IC includes a charger IC for at least one of the wired charging method and the wireless charging method. Wireless charging methods according to embodiments of the present invention may include, for example, a magnetic resonance method, a magnetic induction method and an electromagnetic wave method, and additional circuits for wireless charging, for example, circuits such as a coil loop, a resonant circuit, a rectifier or the like may be added.

The battery gauge measures, for example, a remaining quantity of the battery 1196, or a voltage, a current, or a temperature during charging. The battery 1196 stores or generates electricity and supply power to the electronic device 1100 by using the stored or generated electricity. The battery 1196 may include a rechargeable battery or a solar battery.

The indicator 1197 shows particular statuses of the electronic device 1100 or a part (e.g., AP 1110) of the electronic device 1100, for example, a booting status, a message status, a charging status, etc. The motor 1198 converts an electrical signal to a mechanical vibration. Although not illustrated, the electronic device 1100 may include a processing unit (e.g., a GPU) for supporting a mobile TV. The processing unit for supporting the mobile TV may process, for example, media data according to a standard of Digital Multimedia Broadcasting (DMB), Digital Video Broadcasting (DVB), media flow, etc.

Each of the components of the electronic device according to various embodiments of the present invention may be implemented by one or more components and the name of the corresponding component may vary depending on a type of the electronic device. An electronic device according to various embodiments of the present invention may include at least one of the above described components, a few of the components may be omitted, or additional components may be further included. Also, some of the components of the electronic device according to various embodiments of the present invention may be combined to form a single entity, and thus may equivalently execute functions of the corresponding components before being combined.

Figure 12:
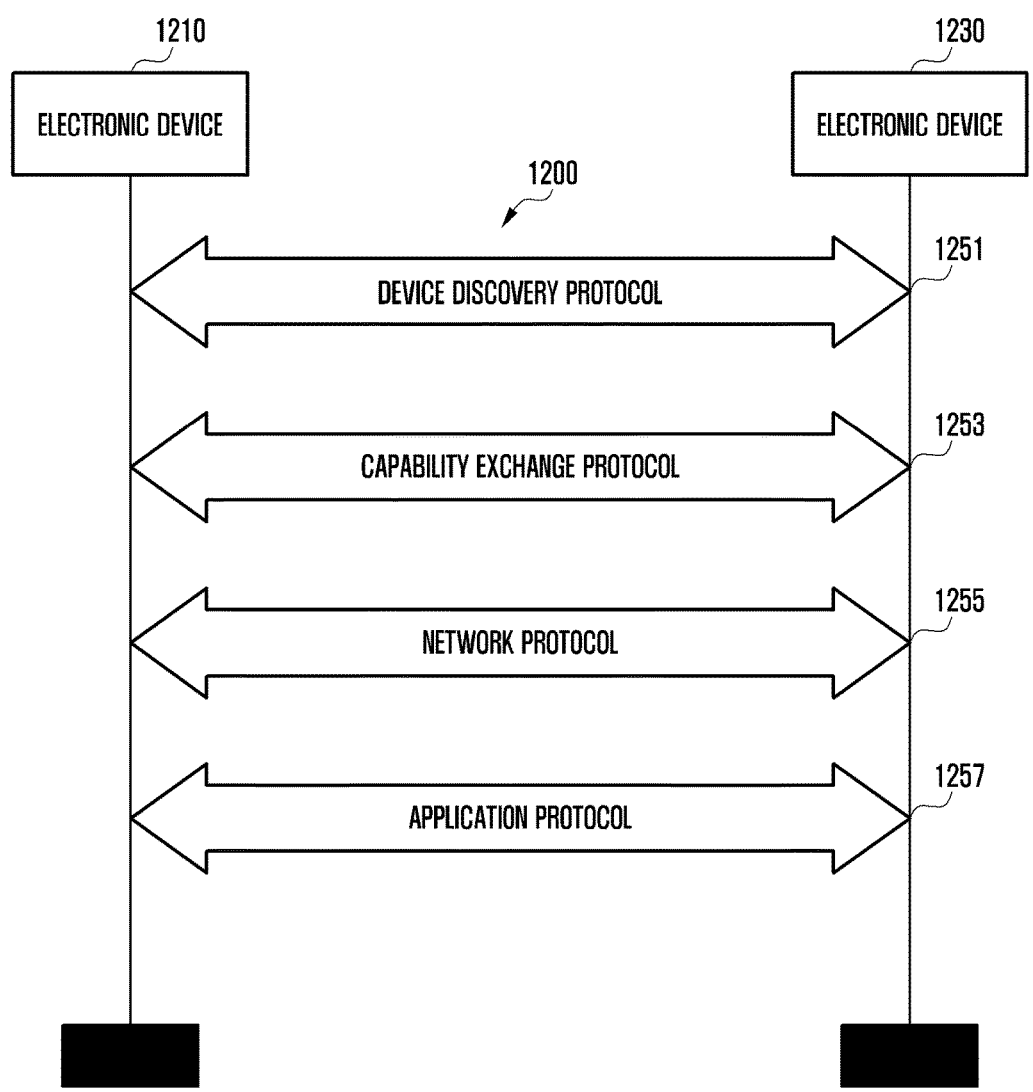
FIG. 12 illustrates communication protocols among a plurality of electronic devices according to an embodiment of the present invention.

FIG. 12 illustrates communication protocols 1200 between a plurality of electronic devices (e.g., a first electronic device 1210 and a second electronic device 1230) according to an embodiment of the present invention.

Referring to FIG. 12, in the present example, the communication protocols 1200 include a device discovery protocol 1251, a capability exchange protocol 1253, a network protocol 1255, and an application protocol 1257.

According to an embodiment of the present invention, the device discovery protocol 1251 is a protocol by which the electronic devices (e.g., the first electronic device 1210 and the second electronic device 1230) detect external devices capable of communicating with the electronic devices, or connect with the detected external electronic devices. For example, the first electronic device 1210 (e.g., the electronic device 101) may detect the second electronic device 1230 (e.g., the electronic device 104) as an electronic device capable of communicating with the first electronic device 1210 through communication methods (e.g., WiFi, BT, USB, etc.) that are available in the first electronic device 1210, by using the device discovery protocol 1251. In order to connect with the second electronic device 1230 for communication, the electronic device 1210 obtains and stores identification information regarding the detected second electronic device 1230, by using the device discovery protocol 1251. The electronic device 1210 initiates the communication connection with the electronic device 1230, for example, based on at least the identification information.

According to an embodiment of the present invention, the device discovery protocol 1251 is a protocol for performing authentication between a plurality of electronic devices. For example, the first electronic device 1210 may perform authentication between the first electronic device 1210 and the second electronic device 1230, based on at least communication information (e.g., Media Access Control (MAC), Universally Unique Identifier (UUID), Subsystem Identification (SSID), and Internet Protocol (IP) address) for connection with the second electronic device 1230.

According to an embodiment of the present invention, the capability exchange protocol 1253 is used to exchange information related to service functions which can be supported by at least one of the first electronic device 1210 or the second electronic device 1230. For example, the first electronic device 1210 and the second electronic device 1230 may exchange information regarding service functions that are currently supported by each electronic device with each other, through the capability exchange protocol 1253. The exchangeable information may include identification information indicating a specific service among a plurality of services supported by the first electronic device 1210 and the second electronic device 1230. For example, the first electronic device 1210 may receive identification information for a specific service provided by the second electronic device 1230 from the second electronic device 1230, through the capability exchange protocol 1253. In this case, the first electronic device 1210 may determine whether the first electronic device 1210 can support the specific service, based on the received identification information.

According to an embodiment of the present invention, the network protocol 1255 is used to control the data flow that is transmitted and received between the first electronic device 1210 and the second electronic device 1230 connected with each other for communication, for example, in order to provide interworking services. For example, at least one of the first electronic device 1210 or the second electronic device 1230 is able to perform the error control or the data quality control, by using the network protocol 1255. Alternatively or additionally, the network protocol 1255 may determine the transmission format of data transmitted and received between the first electronic device 1210 and the second electronic device 1230. In addition, at least one of the first electronic device 1210 or the second electronic device 1230 may manage a session (e.g., session connection or session termination) for the data exchange between them, by using the network protocol 1255.

According to an embodiment of the present invention, the application protocol 1257 is used to provide a procedure or information to exchange data related to services which are provided to the external devices. For example, the first electronic device 1210 (e.g., the electronic device 101) may provide services to the second electronic device 1230 (e.g., the electronic device 104 or the server 106) through the application protocol 1257.

According to an embodiment of the present invention, the communication protocol 1200 includes standard communication protocols, communication protocols designated by individuals or groups (e.g., communication protocols designated by communication device manufacturers or network providers), or a combination thereof.

The term "module", as used herein in describing various embodiments of the present invention may refer to, for example, a "unit" including one of hardware, software, and firmware, or a combination of two or more of the hardware, software, and firmware. The "module" may be interchangeably used with terms such as unit, logic, logical block, component, or circuit. The "module" may be used to refer to a smallest unit of an integrated component or a part thereof. The "module" may also be used to refer to a smallest unit that performs one or more functions or a part thereof. A module may be mechanically or electronically implemented. For example, a module according to various embodiments of the present invention may include at least one of an Application-Specific Integrated Circuit (ASIC) chip, a Field-Programmable Gate Arrays (FPGAs), and a programmable-logic device for performing operations that have been known or are to be developed hereafter.

According to various embodiments of the present invention, at least some of the devices (e.g., modules or functions thereof) or the method (e.g., operations) according to the present invention may be implemented by a command stored in a computer-readable storage medium in a programming module form. If the command is executed by at least one processor, the at least one processor may perform a function corresponding to the command. The computer-readable storage media may be, for example, the memory 120. At least a part of the programming module may be implemented (e.g., executed) by a processor. At least a part of the programming module may include, for example, a module, a program, a routine, a set of instructions, and/or a process for performing at least one function.

A computer readable recording medium may include magnetic media such as a hard disc, a floppy disc, and a magnetic tape, optical media such as a Compact Disc ROM (CD-ROM) and a Digital Versatile Disc (DVD), magneto-optical media such as a floptical disk, and hardware devices specifically configured to store and execute program commands, such as a ROM, a RAM and a flash memory. In addition, the program instructions may include high class language codes, which can be executed in a computer by using an interpreter, as well as machine codes made by a compiler. The aforementioned hardware device may be configured to operate as one or more software modules in order to perform operations according to various embodiments of the present invention, and vice versa.

A module or a programming module according to the present invention may include at least one of the described component elements, a few of the component elements may be omitted, or additional component elements may be included. Operations executed by a module, a programming module, or other component elements according to various embodiments of the present invention may be executed sequentially, in parallel, repeatedly, or in a heuristic manner. Further, some operations may be executed according to another order or may be omitted, or other operations may be added.

Various embodiments of the present invention can efficiently reduce a search range by selecting tags, which are associated with each other, among a plurality of tags as keywords for a search and providing the tags to a user. Further, various embodiments of the present invention can rapidly search for a content, which the user desires, by allowing the user to select a tag, which the user desires, among the selected tags. Various embodiments of the present invention can quickly provide a related tag to the user by acquiring information on contents, in which a selected tag is indexed, from a database and acquiring a tag, in which the acquired information is indexed.

According to various embodiments of the present invention, an electronic device may include a storage medium having commands stored therein. The commands are configured to allow at last one processor to perform one or more operations, if the commands are executed by the at least one processor. The at least one operation may include displaying one or more tags; detecting at least one selection of the one or more tags; displaying one or more tags related to the selected tag; and displaying information on one or more contents related to the selected tag.

While the invention has been shown and described with reference to certain embodiments thereof, it will be understood by those skilled in the art that various changes in form and detail may be made therein without departing from the spirit and scope of present invention, as defined by the appended claims and their equivalents.

What is claimed is:

1. A method comprising:
displaying, on a display of an electronic device, a tag screen for an interaction with a user, the tag screen including tags;
detecting, through an input unit of the electronic device, a user input for a selection of one of the displayed tags;
in response to detecting the user input, displaying, on the tag screen, at least one tag related to the selected tag; and
displaying, on the display, information regarding at least one content related to the selected tag,
wherein displaying the at least one tag related to the selected tag comprises:
obtaining at least one relationship value between the at least one tag and the selected tag, wherein the at least one relationship value corresponds to a number of times that the at least one tag is selected after the selected tag is selected, and
displaying the at least one tag based on an order of the obtained at least one relationship value.

2. An electronic device comprising:
a display configured to display a tag screen for an interaction with a user, the tag screen including tags;
an input unit configured to detect a user input for a selection of one of the displayed tags; and
a processor configured to:
in response to detecting the user input, display at least one tag related to the selected tag on the tag screen, and
display information regarding at least one content related to the selected tag,
wherein the processor is further configured to:
obtain at least one relationship value between the at least one tag and the selected tag, the at least one relationship value corresponding to a number of times that the at least one tag is selected after the selected tag is selected, and
display the at least one tag based on an order of the obtained at least one relationship value.

3. A non-transitory computer-readable recording medium having commands stored therein, the commands being configured to allow at least one processor to perform at least one operation when being executed by the at least one processor for obtaining content information using content tags, the at least one operation comprising:
displaying, on a display of an electronic device, a tag screen for an interaction with a user, the tag screen including tags;
detecting, through an input unit of the electronic device, a user input for a selection of one of the displayed tags;
in response to detecting the user input, displaying, on the tag screen, at least one tag related to the selected tag; and
displaying, on the display, information regarding at least one content related to the selected tag,
wherein displaying the at least one tag related to the selected tag comprises:
obtaining at least one relationship value between the at least one tag and the selected tag, wherein the at least one relationship value corresponds to a number of times that the at least one tag is selected after the selected tag is selected, and
displaying the at least one tag based on an order of the obtained at least one relationship value.

4. The method of claim 1, wherein the selected tag and the at least one tag each belong to different categories.

5. The method of claim 1, wherein displaying the at least one tag based on the order of the obtained at least one relationship value comprises displaying the at least one tag in descending order of the obtained at least one relationship value.

6. The method of claim 1, wherein obtaining the at least one relationship value between the at least one tag and the selected tag comprises:
   obtaining a plurality of relationship values, each of the plurality of relationship values corresponding to a number of times that one of a plurality of tags is selected after the selected tag is selected, the selected tag and the plurality of tags each belonging to different categories; and
   displaying the at least one tag based on the order of the obtained at least one relationship value comprises:
   determining a rank of a category including the selected tag and a rank of each of other categories based on the plurality of relationship values; and
   arranging and displaying the plurality of tags based on the determined ranks.

7. The method of claim 1, wherein displaying the at least one tag in order of the obtained at least one relationship value comprises visually distinguishing the selected tag from the at least one tag.

8. The method of claim 1, further comprising ending, after detecting the user input for the selection of the selected tag, displaying of tags that are not related to the selected tag, among a plurality of tags.

9. The method of claim 1, wherein displaying the at least one tag related to the selected tag comprises:
   displaying at least one of the selected tag and the at least one tag on a part of a screen; and
   additionally displaying the selected tag on another part of the screen.

10. The method of claim 1, wherein displaying the at least one tag comprises:
    displaying information regarding at least one category;
    receiving a selection of at least one of the at least one category; and
    displaying a tag belonging to the selected at least one category.

11. The electronic device of claim 2, wherein the processor is further configured to acquire the information regarding the at least one content related to the selected tag from a storage device, acquire at least one other tag related to the at least one content from the storage device, and display the at least one other tag related to the at least one content on the display.

12. The electronic device of claim 2, wherein the selected tag and the at least one tag each belong to different categories.

13. The electronic device of claim 2, wherein the processor is further configured to visually distinguish the selected tag from the at least one tag.

14. The electronic device of claim 2, wherein, after detecting the user input for the selection of the selected tag, the processor is further configured to end displaying of tags that are not related to the selected tag, among a plurality of tags.

15. The method of claim 6, wherein determining the ranks comprises determining the rank of the category including the selected tag as a first rank and determining the ranks of the other categories sequentially in descending order of the plurality of relationship values.

16. The electronic device of claim 12, wherein the processor is further configured to:
    obtain a plurality of relationship values, each of the plurality of relationship values corresponding to a number of times that one of a plurality of tags is selected after the selected tag is selected, the selected tag and the plurality of tags each belonging to different categories; and
    determine a rank of a category of the selected tag and a rank of each of the other categories based on the plurality of relationship values, and arrange the plurality of tags based on the determined ranks, and display the arranged plurality of tags.

17. The electronic device of claim 16, wherein the processor is further configured to determine the rank of the category including the selected tag as a first rank and determine the ranks of the other categories sequentially in descending order of the plurality of relationship values.

* * * * *